United States Patent
Bai et al.

(10) Patent No.: US 11,716,732 B2
(45) Date of Patent: Aug. 1, 2023

(54) FEEDBACK CONFIGURATION FOR UPLINK CONTROL MESSAGES

(71) Applicant: QUALCOMM Incorporated, San Diego, CA (US)

(72) Inventors: Tianyang Bai, Somerville, NJ (US); Yan Zhou, San Diego, CA (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 17/116,996

(22) Filed: Dec. 9, 2020

(65) Prior Publication Data
US 2022/0183000 A1  Jun. 9, 2022

(51) Int. Cl.
*H04W 72/21* (2023.01)
*H04L 1/1867* (2023.01)
*H04W 24/08* (2009.01)
*H04W 72/23* (2023.01)

(52) U.S. Cl.
CPC ........... *H04W 72/21* (2023.01); *H04L 1/1896* (2013.01); *H04W 24/08* (2013.01); *H04W 72/23* (2023.01)

(58) Field of Classification Search
CPC ............. H04W 24/08; H04W 72/0413; H04W 72/1284; H04W 72/1289; H04L 1/1896
USPC .......................................................... 370/329
See application file for complete search history.

(56) References Cited

U.S. PATENT DOCUMENTS

| | | | |
|---|---|---|---|
| 2015/0163794 A1* | 6/2015 | Liang | H04W 72/0413 370/329 |
| 2015/0312922 A1* | 10/2015 | Uchino | H04L 5/1423 370/329 |
| 2018/0227936 A1* | 8/2018 | Yerramalli | H04L 1/0067 |

(Continued)

OTHER PUBLICATIONS

Convida Wireless: "Autonomous Uplink Transmission in NR Unlicensed", 3GPP TSG-RAN WG1 Meeting #94, 3GPP Draft, R1-1809382_Autonomous Uplink Transmission in NR Unlicensed, 3rd Generation Partnership Project (3GPP), Mobile Competence Centre, 650, Route Des Lucioles, F-06921 Sophia-Antipolis Cedex, vol. RAN WG1, No. Gothenburg, Sweden, Aug. 20, 2018-Aug. 24, 2018, 5 Pages, Aug. 11, 2018 (Aug. 11, 2018), XP051516746, Retrieved from the Internet: URL: http://www.3gpp.org/ftp/tsg%5Fran/WG1%5FRL1/TSGR1%5F94/Docs/R1%2D1809382%2Ezip [retrieved on Aug. 11, 2018], section 2.

(Continued)

*Primary Examiner* — Chi Tang P Cheng
(74) *Attorney, Agent, or Firm* — Holland & Hart LLP

(57) ABSTRACT

Methods, systems, and devices for wireless communications are described. A user equipment (UE) may identify, based on attributes of an uplink control information (UCI) message transmitted by the UE to a base station, whether transmitting the UCI message will trigger a feedback message from the base station. The UE may transmit the UCI message to a base station in uplink control channel resources. The UE may determine a feedback configuration corresponding to the UCI message based on attributes of the UCI message. The feedback configuration may indicate whether the UCI triggers a feedback message. The UE may monitor for the feedback message responsive to the UCI message based on the feedback configuration.

28 Claims, 16 Drawing Sheets

(56) References Cited

U.S. PATENT DOCUMENTS

2019/0342911 A1* 11/2019 Talarico ............... H04L 1/0025
2019/0380138 A1* 12/2019 Zhang .................. H04L 1/1819

OTHER PUBLICATIONS

International Search Report and Written Opinion—PCT/US2021/072092—ISA/EPO—dated Feb. 11, 2022 (2101021WO).
Nokia, et al., "On Support of UL Transmission with Configured Grants in NR-U", 3GPP TSG RAN WG1 Meeting #99, 3GPP Draft, R1-1912260, 3rd Generation Partnership Project (3GPP), Mobile Competence Centre, 650, Route Des Lucioles, F-06921 Sophia-Antipolis Cedex, France, vol. RAN WG1, No. Reno, US, Nov. 18, 2019-Nov. 22, 2019, 9 Pages, Nov. 8, 2019 (Nov. 8, 2019), XP051819975, Retrieved from the Internet: URL: https://ftp.3gpp.org/tsg_ran/WG1_RL1/TSGR1_99/Docs/R1-1912260.zip R1-1912260 NR-U configured grant.docx [retrieved on Nov. 8, 2019], sections 2, 3.

* cited by examiner

FEEDBACK CONFIGURATION FOR UPLINK CONTROL MESSAGES

FIELD OF TECHNOLOGY

The following relates to wireless communications, including feedback configuration for uplink control messages.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some UEs may transmit an uplink control information (UCI) report to a base station.

SUMMARY

The described techniques relate to improved methods, systems, devices, and apparatuses that support feedback configuration for uplink control messages. Generally, the described techniques provide for determining a feedback configuration corresponding to an uplink control information (UCI) message transmitted from a user equipment (UE) to a base station.

A method for wireless communication at a user equipment (UE) is described. The method may include transmitting an uplink control information (UCI) message in uplink control channel resources, determining a feedback configuration corresponding to the UCI message based on a set of attributes of the UCI message, where the feedback configuration indicates whether the UCI message triggers a feedback message, and monitoring for the feedback message responsive to the UCI message based on the feedback configuration.

An apparatus for wireless communication at a UE is described. The apparatus may include a processor, memory in electronic communication with the processor, and instructions stored in the memory. The instructions may be executable by the processor to cause the apparatus to transmit an UCI message in uplink control channel resources, determine a feedback configuration corresponding to the UCI message based on a set of attributes of the UCI message, where the feedback configuration indicates whether the UCI message triggers a feedback message, and monitor for the feedback message responsive to the UCI message based on the feedback configuration.

Another apparatus for wireless communication at a UE is described. The apparatus may include means for transmitting an UCI message in uplink control channel resources, means for determining a feedback configuration corresponding to the UCI message based on a set of attributes of the UCI message, where the feedback configuration indicates whether the UCI message triggers a feedback message, and means for monitoring for the feedback message responsive to the UCI message based on the feedback configuration.

A non-transitory computer-readable medium storing code for wireless communication at a UE is described. The code may include instructions executable by a processor to transmit an UCI message in uplink control channel resources, determine a feedback configuration corresponding to the UCI message based on a set of attributes of the UCI message, where the feedback configuration indicates whether the UCI message triggers a feedback message, and monitor for the feedback message responsive to the UCI message based on the feedback configuration.

In some examples of the method, apparatuses, and non-transitory computer-readable medium described herein, the set of attributes includes a format of the UCI message.

In some examples of the method, apparatuses, and non-transitory computer-readable medium described herein, the set of attributes includes a payload size associated with the UCI message.

In some examples of the method, apparatuses, and non-transitory computer-readable medium described herein, the set of attributes includes a priority of the uplink control channel resources.

In some examples of the method, apparatuses, and non-transitory computer-readable medium described herein, the set of attributes includes a trigger condition for triggering an autonomous state change at the UE based on transmission of the UCI message.

Some examples of the method, apparatuses, and non-transitory computer-readable medium described herein may further include operations, features, means, or instructions for receiving the feedback message based on the monitoring and performing the autonomous state change based on receiving the feedback message.

In some examples of the method, apparatuses, and non-transitory computer-readable medium described herein, the set of attributes includes a dynamic indication that indicates the feedback configuration for the UCI message.

In some examples of the method, apparatuses, and non-transitory computer-readable medium described herein, the set of attributes includes a scheduling type associated with the uplink control channel resources.

Some examples of the method, apparatuses, and non-transitory computer-readable medium described herein may further include operations, features, means, or instructions for retransmitting the UCI message based on the monitoring and expiration of a timer.

In some examples of the method, apparatuses, and non-transitory computer-readable medium described herein, the feedback message includes an indication of an association between the feedback message and the UCI message.

In some examples of the method, apparatuses, and non-transitory computer-readable medium described herein, the indication of the association between the feedback message and the UCI message includes bitmap information corresponding to the uplink control channel resources.

Some examples of the method, apparatuses, and non-transitory computer-readable medium described herein may further include operations, features, means, or instructions for receiving the feedback message based on the monitoring and identifying an association between the feedback message and the UCI message based on a duration between transmitting the UCI message and receiving the feedback message.

Some examples of the method, apparatuses, and non-transitory computer-readable medium described herein may further include operations, features, means, or instructions for receiving the feedback message in a downlink control information (DCI) message over downlink control channel resources and where bitmap information in a field of the DCI message includes an indication of an association between the feedback message and the UCI message.

A method for wireless communication at a base station is described. The method may include receiving an UCI message in uplink control channel resources, determining a feedback configuration corresponding to the UCI message based on a set of attributes of the UCI message, where the feedback configuration indicates whether the UCI message triggers a feedback message, and transmitting the feedback message responsive to the UCI message based on the feedback configuration.

An apparatus for wireless communication at a base station is described. The apparatus may include a processor, memory in electronic communication with the processor, and instructions stored in the memory. The instructions may be executable by the processor to cause the apparatus to receive an UCI message in uplink control channel resources, determine a feedback configuration corresponding to the UCI message based on a set of attributes of the UCI message, where the feedback configuration indicates whether the UCI message triggers a feedback message, and transmit the feedback message responsive to the UCI message based on the feedback configuration.

Another apparatus for wireless communication at a base station is described. The apparatus may include means for receiving an UCI message in uplink control channel resources, means for determining a feedback configuration corresponding to the UCI message based on a set of attributes of the UCI message, where the feedback configuration indicates whether the UCI message triggers a feedback message, and means for transmitting the feedback message responsive to the UCI message based on the feedback configuration.

A non-transitory computer-readable medium storing code for wireless communication at a base station is described. The code may include instructions executable by a processor to receive an UCI message in uplink control channel resources, determine a feedback configuration corresponding to the UCI message based on a set of attributes of the UCI message, where the feedback configuration indicates whether the UCI message triggers a feedback message, and transmit the feedback message responsive to the UCI message based on the feedback configuration.

In some examples of the method, apparatuses, and non-transitory computer-readable medium described herein, the set of attributes includes a format of the UCI message.

In some examples of the method, apparatuses, and non-transitory computer-readable medium described herein, the set of attributes includes a payload size associated with the UCI message.

In some examples of the method, apparatuses, and non-transitory computer-readable medium described herein, the set of attributes includes a priority of the uplink control channel resources.

In some examples of the method, apparatuses, and non-transitory computer-readable medium described herein, the set of attributes includes a trigger condition for triggering an autonomous state change at the base station.

Some examples of the method, apparatuses, and non-transitory computer-readable medium described herein may further include operations, features, means, or instructions for transmitting the feedback message based on receiving the UCI message and performing the autonomous state change based on receiving the UCI message.

In some examples of the method, apparatuses, and non-transitory computer-readable medium described herein, the set of attributes includes a dynamic indication that indicates the feedback configuration for the UCI message.

In some examples of the method, apparatuses, and non-transitory computer-readable medium described herein, the set of attributes includes a scheduling type associated with the uplink control channel resources.

Some examples of the method, apparatuses, and non-transitory computer-readable medium described herein may further include operations, features, means, or instructions for receiving a retransmission of the UCI message based on expiration of a timer.

In some examples of the method, apparatuses, and non-transitory computer-readable medium described herein, the feedback message includes an indication of an association between the feedback message and the UCI message.

In some examples of the method, apparatuses, and non-transitory computer-readable medium described herein, the indication of the association between the feedback message and the UCI message includes bitmap information corresponding to of the uplink control channel resources.

Some examples of the method, apparatuses, and non-transitory computer-readable medium described herein may further include operations, features, means, or instructions for transmitting the feedback message in a DCI message over downlink control channel resources and where bitmap information in a field of the DCI message includes an indication of an association between the feedback message and the UCI message.

DETAILED DESCRIPTION

Figure 1:
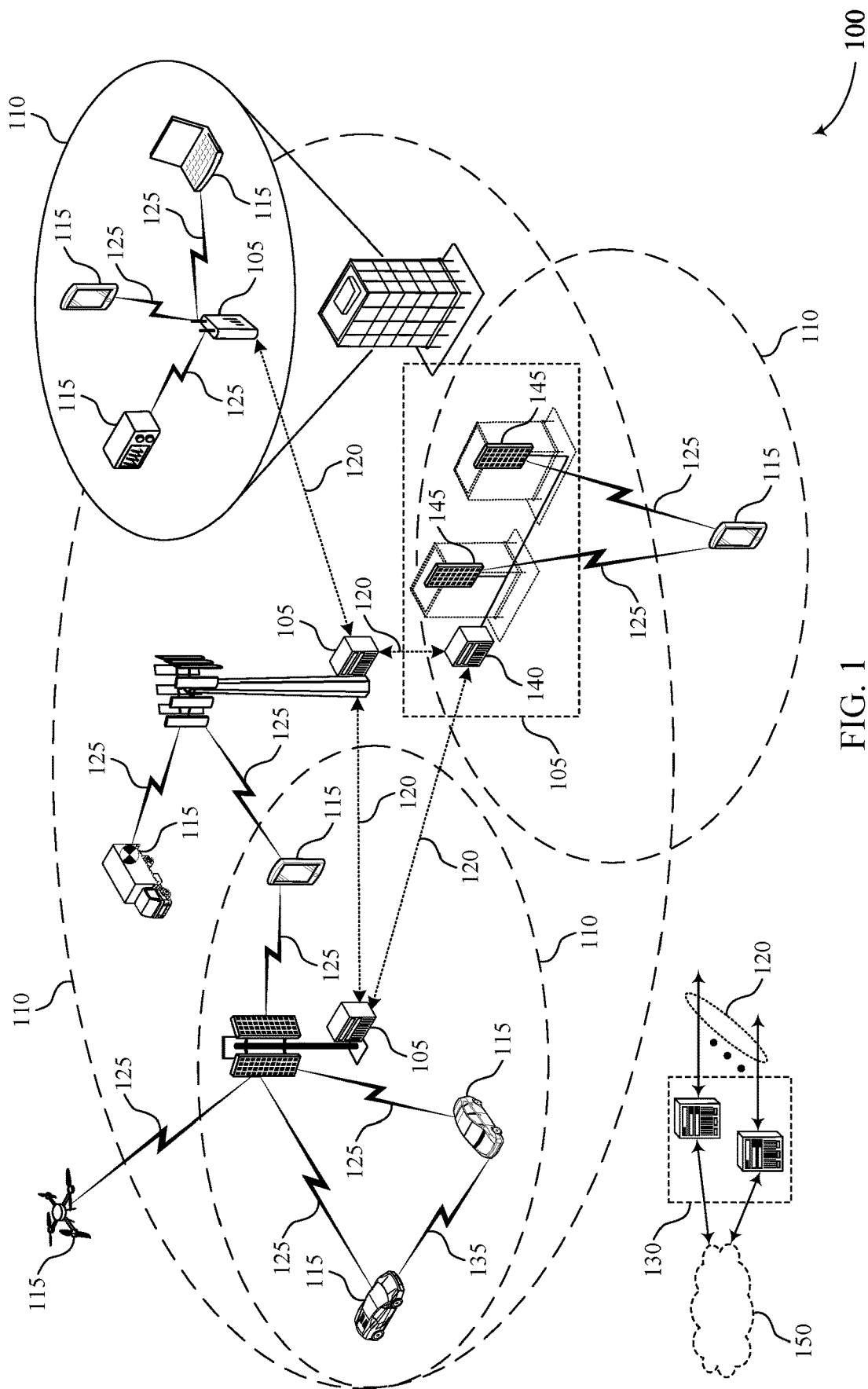
FIG. 1 illustrates an example of a wireless communications system that supports feedback configuration for uplink control messages in accordance with aspects of the present disclosure.

In some wireless communications systems, data channels or control channels may carry information and indicators from a user equipment (UE), such as uplink control information (UCI) messages, to a base station. The UCI messages may support the scheduling of uplink shared channel transmissions (e.g., physical uplink shared channel (PUSCH) transmissions). In some examples, a UE may transmit a UCI report to a base station. The UCI report may include, for example, hybrid automatic repeat request (HARQ) feedback information (e.g., an positive acknowledgement (ACK) or negative acknowledgement (NACK)) regarding a downlink data channel transmission (e.g., a physical downlink scheduled channel (PDSCH) transmission) or a downlink control channel transmit (e.g., a physical downlink control channel (PDCCH) transmission). In some cases, the UCI report may include a scheduling request or a channel state information (CSI) report.

In some cases, the UE may transmit the UCI report over an uplink shared channel (e.g., PUSCH) transmission. The UE may receive, from the base station, signaling which may serve as ACK feedback for the UCI report carried over the PUSCH transmission. For example, the UE may receive downlink feedback information (DFI) from the base station over downlink control information (DCI) (e.g., DCI format 0_1 to convey ACK/NACK feedback for a configured grant (CG) PUSCH transmission). In some examples, the DFI may include a 16 bit field mapping respectively corresponding to, for example, up to 16 HARQ processes for the CG PUSCH transmission. In another example, the UE may receive a grant for an additional PUSCH transmission having the same HARQ identifier as the PUSCH transmission carrying the UCI report. The UE may regard the DFI or the grant for the additional PUSCH transmission as ACK feedback (e.g., an acknowledgement that the base station received the UCI report).

In some other cases, the UE may transmit the UCI report over an uplink control channel (e.g., physical uplink control channel (PUCCH)) transmission. However, some systems may not support dedicated feedback (e.g., ACK/NACK) for UCI reports transmitted over a PUCCH transmission. Such cases, for example, may prevent autonomous state changes (e.g., changes to a transmission configuration indicator (TCI) state) to be triggered at the UE or the base station. For example, without a dedicated feedback (e.g., ACK/NACK) for UCI reports transmitted by the UE over a PUCCH transmission, the UE may be unable to confirm whether the base station has successfully received the UCI report (and accordingly, switched to a different TCI state). For example, without the confirmation, the UE may be unable to determine whether to also switch to the different TCI state.

In some examples, some UCI reports transmitted over a PUSCH transmission or a PUCCH transmission may trigger an autonomous state change in the UE or the base station. For example, a CSI report may autonomously trigger a TCI update for a PDSCH or a CSI-reference signal (RS). In another example, a panel related report (e.g., a panel update report) may trigger autonomous switching on and off of an antenna panel of the UE or the base station. In some other examples, an uplink beam report due to maximum permissible exposure (MPE) conditions may trigger autonomous switching of a beam or antenna panel used by the UE or the base station. Accordingly, providing the UE with an indication (e.g., ACK/NACK feedback) of whether a transmitted UCI report has been successfully conveyed to the base station may provide optimization for communications between the UE and the base station (e.g., reducing latency).

According to examples of aspects described herein, a UE may identify, based on attributes of a UCI message transmitted by the UE to a base station, whether transmitting the UCI message will trigger a feedback message from the base station. In an example, the UE may transmit a UCI message to a base station in uplink control channel resources. For example, the UE may transmit the UCI message over a PUCCH transmission. The UE may determine a feedback configuration corresponding to the UCI message based on attributes of the UCI message. In some aspects, the feedback configuration may indicate whether the UCI message triggers a feedback message from the base station. The UE may monitor for the feedback message responsive to the UCI message based on the feedback configuration.

In some examples, the base station may determine the feedback configuration based on receiving the UCI message. For example, the base station may determine the feedback configuration corresponding to the UCI message based on attributes of the UCI message. In an example, the base station may transmit (and the UE may receive) the feedback message based on the feedback configuration. In some aspects, based on receiving the feedback message, the UE may perform an autonomous state change based on receiving the feedback message.

In some other aspects, the attributes of the UCI message may define whether transmitting a UCI message will trigger an autonomous state change at the UE. For example, the attributes may include a trigger condition for triggering an autonomous state change at the UE based on transmission of the UCI message. In some other aspects, the attributes of the UCI message may define whether the UCI message will trigger an autonomous state change at the base station. For example, the attributes may include a trigger condition for triggering an autonomous state change at the base station based on the base station receiving the UCI message.

In some aspects, the attributes may include a format of the UCI message. In some examples, the attributes may include a payload size associated with the UCI message. For example, the attributes may include a PUCCH format associated with a relatively large payload size. In another example, the attributes may include a PUCCH format associated with a relatively small payload size.

In some other aspects, the attributes may include a priority of the uplink control channel resources. In some examples, the attributes may include an indication of a high priority or a low priority the UCI message. For example, the attributes may indicate a relatively high priority for the payload of the UCI message. In another example, the attributes may indicate a relatively low priority for the payload of the UCI message. Additional example aspects of the attributes and the feedback message are described herein.

Aspects of the subject matter described herein may be implemented to realize one or more advantages. The described techniques may support improvements in spectral efficiency and reliability, among other advantages. In some aspects, determining a feedback configuration corresponding to an UCI message transmitted over uplink control channel resources (e.g., a PUCCH transmission) based on attributes of the UCI message may optimize processing overhead at a UE. For example, by identifying whether the UCI message triggers a feedback message, the UE may determine whether to monitor for the feedback message, optimizing both processing and power overhead.

Aspects of the disclosure are initially described in the context of a wireless communications system. Examples of processes and signaling exchanges that support feedback configuration for uplink control messages are then described. Aspects of the disclosure are further illustrated by and described with reference to apparatus diagrams, system diagrams, and flowcharts that relate to feedback configuration for uplink control messages.

FIG. 1 illustrates an example of a wireless communications system 100 that supports feedback configuration for uplink control messages in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to examples of aspects described herein, a UE 115 may identify, based on attributes of a UCI message transmitted by the UE 115 to a base station 105, whether transmitting the UCI message will trigger a feedback message from the base station 105. In an example, the UE 115 may transmit a UCI message to a base station 105 in uplink control channel resources. For example, the UE 115 may transmit the UCI message over a PUCCH transmission. The UE 115 may determine a feedback configuration corresponding to the UCI message based on attributes of the UCI message. In some aspects, the feedback configuration may indicate whether the UCI message triggers a feedback message. The UE 115 may monitor for the feedback message responsive to the UCI message based on the feedback configuration.

In some examples, the base station 105 may determine the feedback configuration based on receiving the UCI message. For example, the base station 105 may determine the feedback configuration corresponding to the UCI message based on attributes of the UCI message. In an example, the base station 105 may transmit (and the UE 115 may receive) the feedback message based on the feedback configuration. In some aspects, based on receiving the feedback message, the UE 115 may perform an autonomous state change based on receiving the feedback message.

In some other aspects, the attributes of the UCI message may define whether transmitting a UCI message will trigger an autonomous state change at the UE 115. For example, the attributes may include a trigger condition for triggering an autonomous state change at the UE 115 based on transmission of the UCI message. In some other aspects, the attributes of the UCI message may define whether the UCI message will trigger an autonomous state change at the base station 105. For example, the attributes may include a trigger condition for triggering an autonomous state change at the base station 105 based on the base station 105 receiving the UCI message.

The attributes may include a format of the UCI message. In some examples, the attributes may include a payload size associated with the UCI message. For example, the attributes may include a PUCCH format associated with a relatively large payload size. In another example, the attributes may include a PUCCH format associated with a relatively small payload size.

The attributes may include a priority of the uplink control channel resources. In some examples, the attributes may include an indication of a high priority or a low priority the UCI message. For example, the attributes may indicate a relatively high priority for the payload of the UCI message. In another example, the attributes may indicate a relatively low priority for the payload of the UCI message. Additional example aspects of the attributes and the feedback message are described herein.

Aspects of the subject matter described herein may be implemented to realize one or more advantages. The described techniques may support improvements in spectral efficiency and reliability, among other advantages. In some aspects, determining a feedback configuration corresponding to an UCI message transmitted over uplink control channel resources (e.g., a PUCCH transmission) based on attributes of the UCI message may optimize processing overhead at a UE 115. For example, by identifying whether the UCI message triggers a feedback message, the UE 115 may determine whether to monitor for the feedback message, optimizing both processing and power overhead. In some examples, by identifying whether attributes of the feedback configuration include a trigger condition for triggering an autonomous state change at the UE 115 based on transmission of the UCI message, the UE 115 may further achieve optimizations in both processing and power overhead.

Figure 2:
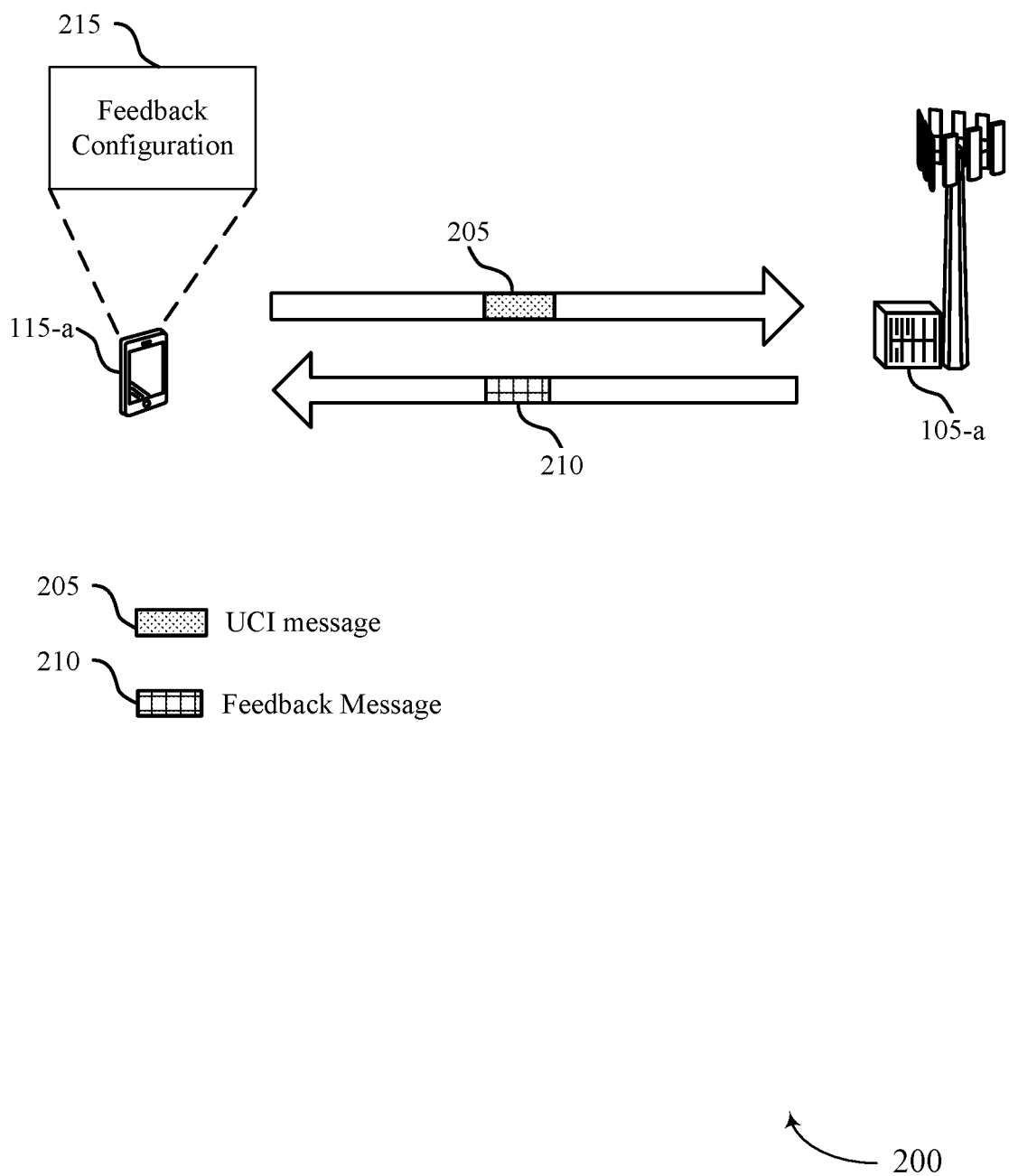
FIG. 2 illustrates an example of a wireless communications system that supports feedback configuration for uplink control messages in accordance with aspects of the present disclosure.

FIG. 2 illustrates an example of a wireless communications system 200 that supports feedback configuration for uplink control messages in accordance with aspects of the present disclosure. In some examples, wireless communications system 200 may implement aspects of wireless communication system 100 and may include a UE 115-a and a base station 105-a, which may be examples of a UE 115 and a base station 105, respectively, described with reference to FIG. 1.

As discussed with reference to FIG. 2, the UE 115-a may identify, based on attributes of a UCI message 205 transmitted by the UE 115-*a* to a base station 105-*a*, whether transmitting the UCI message 205 will trigger a feedback message from the base station 105-*a*. In an example, the UE 115-*a* may transmit a UCI message 205 to a base station 105-*a* in uplink control channel resources. For example, the UE 115-*a* may transmit the UCI message 205 over PUCCH resources (e.g., a PUCCH transmission). The UE 115-*a* may determine a feedback configuration 215 corresponding to the UCI message 205 based on attributes of the UCI message 205. In some aspects, the feedback configuration 215 may indicate whether the UCI 205 triggers a feedback message 210. The UE 115-*a* may monitor for the feedback message 210 responsive to the UCI message 205 based on the feedback configuration 215.

In some examples, the base station 105-*a* may determine the feedback configuration 215 based on receiving the UCI message 205. For example, the base station 105-*a* may determine the feedback configuration 215 corresponding to the UCI message 205 based on attributes of the UCI message 205. In an example, the base station 105-*a* may transmit (and the UE 115-*a* may receive) the feedback message 210 based on the feedback configuration 215. In some aspects, the base station 105-*a* may transmit the feedback message 210 to the UE 115-*a* after successful decoding of the UCI message 205. In some examples, the base station 105-*a* may transmit the feedback message 210 over DCI (e.g., in a DCI message). For example, the base station 105-*a* may transmit the feedback message 210 in a DCI message over downlink control channel resources (e.g., PDCCH resources).

In some aspects, the feedback message 210 may be a dedicated field according to a DCI format of the DCI message. In some examples, bitmap information in a field of the DCI message may include an indication of an association between the feedback message 210 and the UCI message 205. In an example, the DCI may reuse a portion of an existing DCI format (e.g., downlink DCI format 1_0, 1_1, or 1_2) and a field (e.g., reserved field) or fields of the DCI format may include the bitmap information indicating to the association.

In another example, the DCI format may be different from the existing DCI format (e.g., downlink DCI format 1_0, 1_1, or 1_2), and a portion of the DCI format may include the bitmap field. In some aspects, the UE 115-*a* may configure the DCI in dedicated search spaces in a CORE-SET. For example, the UE 115-*a* may be configured with dedicated candidate tones to receive the DCI.

In some aspects, the UE 115-*a* may perform an autonomous state change based on receiving the feedback message 210. In some other aspects, the UE 115-*a* may perform an autonomous state change based on the attributes of the UCI message 205, or based on transmitting the UCI message 205. For example, the attributes of the UCI message 205 may define whether transmitting a UCI message 205 will trigger an autonomous state change at the UE 115-*a*.

In an example, the attributes may include a trigger condition for triggering an autonomous state change at the UE 115-*a* based on transmission of the UCI message 205. In some examples, the attributes of the UCI message 205 may define whether the receipt of the UCI message 205 will trigger an autonomous state change at the base station 105-*a*. For example, the attributes may include a trigger condition for triggering an autonomous state change at the base station 105-*a* based on the base station 105-*a* receiving the UCI message 205.

In some aspects, the attributes may include a format of the UCI message 205. For example, the attributes may include a payload size associated with the UCI message 205. In an example, the attributes may include a PUCCH format. In some examples, the PUCCH format may be associated with a relatively small payload size (e.g., the UCI message 205 may be a relatively short PUCCH transmission). In another example, the PUCCH format may be associated with a relatively large payload size (e.g., the UCI message 205 may be a relatively long PUCCH transmission).

In some aspects, the attributes may include a priority of the uplink control channel resources. In some examples, the attributes may include an indication of a relatively high priority or low priority of the UCI message 205. For example, the attributes may indicate a relatively high priority for the payload of the UCI message 205. In another example, the attributes may indicate a relatively low priority for the payload of the UCI message 205. In some aspects, the UCI message 205 may be a PUCCH transmission, and a field in the PUCCH transmission may indicate the priority thereof.

In an example, for a UCI message 205 having a relatively high priority, the UE 115-*a* may expect or monitor for a feedback message 210. Additionally, or alternatively, for a UCI message 205 having a relatively low priority, the UE 115-*a* may not expect or may refrain from monitoring for a feedback message 210. In an example, the base station 105-*a* may transmit a feedback message 210 for a UCI message 205 having a relatively high priority. Additionally, or alternatively, the base station 105-*a* may refrain from transmitting a feedback message 210 for a UCI message 205 having a relatively low priority.

In some aspects, the attributes may include a dynamic indication of the feedback configuration for the UCI message 205. For example, the base station 105-*a* may dynamically configure whether transmission of the UCI message 205 should expect a corresponding feedback message 210. In some aspects, the base station 105-*a* may provide dynamic configuration with reference to a table communicated by the base station 105-*a* over RRC signaling.

In some aspects, the attributes may include a scheduling type associated with the uplink control channel resources. The scheduling type may be, for example, a semi-persistent scheduling (SPS) type or a dynamic scheduling type. In an example in which the scheduling type is an SPS type, the UE 115-*a* may transmit UCI messages (e.g., UCI message 205) in accordance with a semi-persistent schedule configured by the base station 105-*a*. The UE 115-*a* may expect or monitor for feedback messages (e.g., feedback message 210) for UCI messages (e.g., UCI message 205) transmitted in accordance with the semi-persistent schedule.

In another example, in which the scheduling type is dynamic, the UE 115-*a* may receive a first DCI message from the base station 105-*a* including a first scheduling grant for transmitting the UCI message 205. The UE 115-*a* may transmit the UCI message 205 in accordance with the first scheduling grant. In an example, if the base station 105-*a* does not receive or does not successfully decode the UCI message 205, the base station 105-*a* may transmit a second DCI message including a second scheduling grant for a subsequent transmission (e.g., retransmission) of the UCI message 205. In some aspects, the UE 115-*a* may regard the second DCI message as a NACK associated with the first transmission of the UCI message 205.

In some aspects, the UE 115-*a* may assume that the first transmission of the UCI message 205 is successfully received or decoded at the base station 105-*a*, based on a timer (e.g., duration) following the first transmission of the UCI message 205. For example, if by the expiration of the timer (e.g., end of the duration), the UE 115-*a* does not receive a second scheduling grant for a subsequent transmission (e.g., retransmission) of the UCI message 205, the UE 115-a may assume that the first transmission of the UCI message 205 was successfully received or decoded at the base station 105-a. In an example, the UE 115-a may perform an autonomous state change based on the expiration of the timer.

The feedback message 210 may include an indication of an association between the feedback message 210 and the UCI message 205. For example, the UE 115-a may transmit multiple UCI messages (e.g., UCI message 205 and other UCI messages), and the base station 105-a may transmit multiple feedback messages (e.g., feedback message 210 and other feedback messages) corresponding to the UCI messages. Each of the feedback messages may include an indication of an association between the feedback message and a corresponding UCI message. In an example, the UE 115-a may determine that the feedback message 210 corresponds to the UCI message 205 based on the indication.

In an example, the feedback message 210 may include DCI including bitmap information. The bitmap information may correspond to the uplink control channel resources (e.g., PUCCH resources) over which the UE 115-a transmitted the UCI message 205. In another example, in which the UCI message 205 includes a CSI measurement or a report configuration, the bitmap information may be associated with an identifier for the CSI measurement or a report configuration. In some aspects, the base station 105-a may transmit RRC signaling to the UE 115-a inclusive of a configuration of the bitmap. For example, the base station 105-a may configure (e.g., preconfigure) the bitmap using RRC signaling.

In some other aspects, the UE 115-a may identify an association between the feedback message 210 and the UCI message 205 based on a duration (e.g., time offset) between transmitting the UCI message 205 and receiving the feedback message 210. In some aspects, the duration may be fixed. In some other aspects, the duration may be varied or modified.

Figure 3:
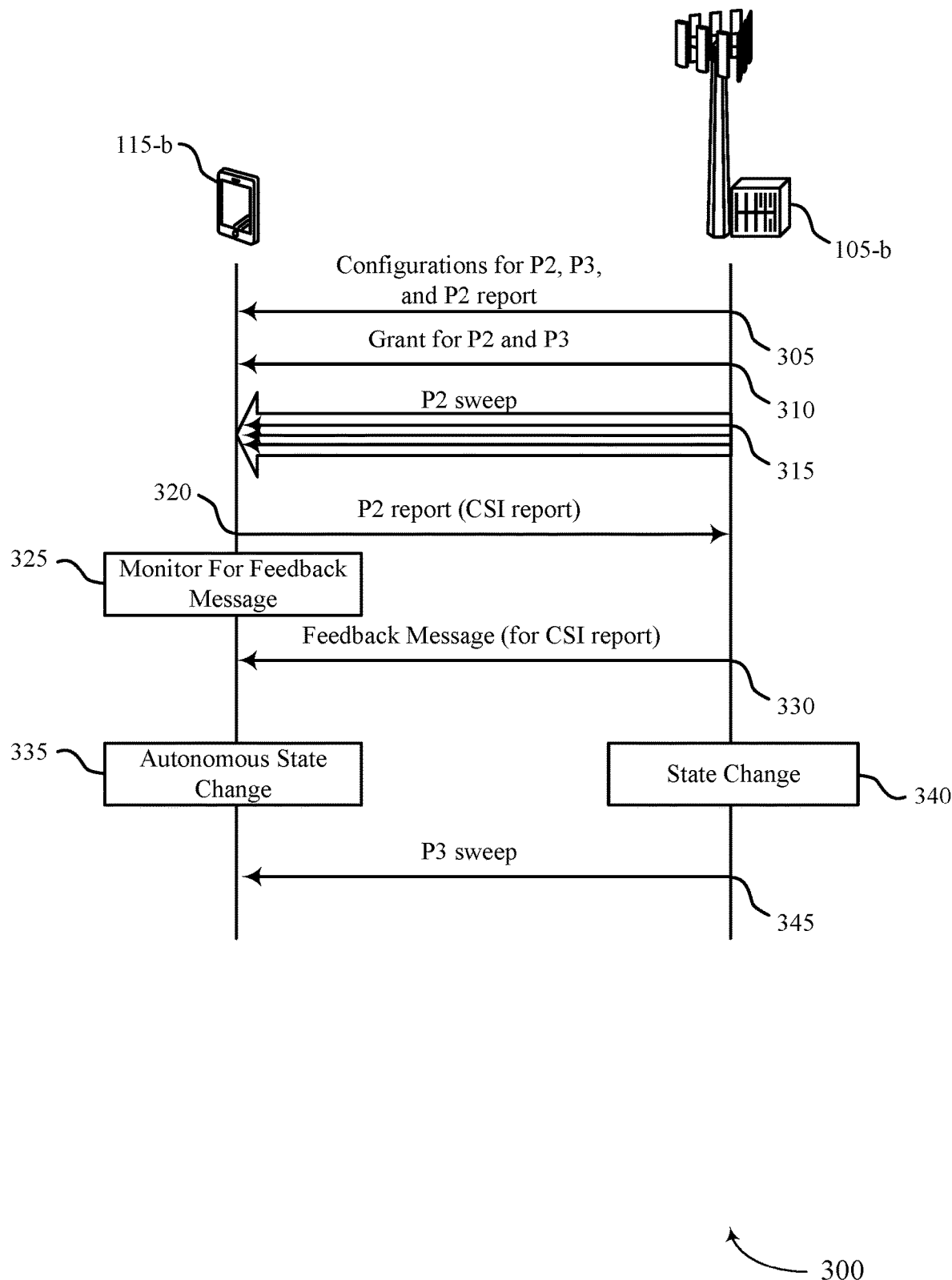
FIG. 3 illustrates an example of a process flow that supports feedback configuration for uplink control messages in accordance with aspects of the present disclosure.

FIG. 3 illustrates an example of a process flow 300 that supports feedback configuration for uplink control messages in accordance with aspects of the present disclosure. In some examples, process flow 300 may implement aspects of wireless communications systems 100 or 200. Additionally, process flow 300 may implement aspects of a UCI message 205 (in which the UCI message 205 includes a CSI report) and a corresponding feedback message 210 (e.g., an ACK), as described with reference to FIG. 2.

For example, process flow 300 may include example aspects of updating a CSI-RS beam based on an earlier CSI report (e.g., a previously transmitted UCI message including the CSI report) and a corresponding feedback message (e.g., an ACK). Further, process flow 300 may be implemented by a UE 115-b and a base station 105-b, which may be examples of a UE 115, a UE 115-a, a base station 105, and a base station 105-a described with reference to FIGS. 1 and 2.

In the following description of the process flow 300, the operations between UE 115-b and base station 105-b may be transmitted in a different order than the order shown, or the operations performed by base station 105-b and UE 115-b may be performed in different orders or at different times. Certain operations may also be left out of the process flow 300, or other operations may be added to the process flow 300. It is to be understood that while base station 105-b and UE 115-b are shown performing a number of the operations of process flow 300, any wireless device may perform the operations shown.

At 305, the base station 105-b may transmit signaling indication configurations for P2 procedures (e.g., beam refinement for transmit beams of the base station 105-b, during which the base station 105-b may transmit a series (e.g., a sweep) of transmit beams and the UE 115-b may provide a CSI report regarding the sweep) and P3 procedures (e.g., beam refinement for receive beams of the UE 115-b, during which the UE 115-b may perform a sweep of receive beams while the base station 105-b transmits a constant transmit beam). The signaling may include configurations for providing the P2 procedures report to the base station 105-b.

At 310, the base station 105-b may transmit a single grant for triggering the P2 procedures and the P3 procedures. In an example, the grant may trigger a CSI-RS for the P3 procedures and a CSI report for the P2 procedures. In some aspects, when configuring the CSI-RS for the P3 procedures, the TCI state may be pointed (e.g., temporarily) to a beam associated with a previous P1 procedure (e.g., a beam selected by the UE 115-b based on a beam sweep by the base station 105-b). For example, the TCI state may be pointed (e.g., temporarily) to a source RS of the beams associated with the P2 procedures.

At 315, the base station 105-b may perform P2 procedures (e.g., P2 beam sweep).

At 320, the UE 115-b may provide a P2 report (e.g., reporting of a best transmit beam determined by the UE 115-b) to the base station 105-b. The P2 report may be referred to herein as a P2 beam report. The P2 report may include a CSI report.

At 325, the UE 115-b may wait or monitor for a feedback message (e.g., ACK) corresponding to the P2 report. For example, the UE 115-b may wait or monitor for the feedback message (e.g., ACK) based on transmitting the P2 report (e.g., CSI report).

At 330, the UE 115-b may receive a feedback message (e.g., ACK) from the base station 105-b.

In some examples, the UE 115-b may retransmit the P2 report (e.g., CSI report) based on an expiration of a timer. In some aspects, the timer may begin after the UE 115-b transmits the P2 report (e.g., CSI report) at 320. In some examples, the UE 115-b may retransmit the P2 report (e.g., CSI report) in a next available reporting occasion.

At 335, the UE 115-b may perform an autonomous state change based on receiving the feedback message (e.g., ACK). For example, after receiving the ACK, the UE 115-b may perform the autonomous TCI state update based on the P2 report. In an example, the UE 115-b may autonomously update the TCI state of the P3 CSI-RS (e.g., CSI-RS for the P3 procedures) based on the P2 report and a rule (e.g., the best transmit beam (with respect to a measurement) in the P2 report). In some aspects, if UE 115-b does not receive the feedback message (e.g., ACK) for the P2 report (e.g., CSI report), the UE 115-b may refrain from perform the autonomous TCI state update.

At 340, based on receiving the P2 report, the base station 105-b may perform the same update as the UE 115-b according to the same rule followed by the UE 115-b (e.g., the best transmit beam (with respect to a measurement) in the P2 report).

At 345, the base station 105-b may perform P3 procedures (P3 sweep of a CSI-RS) based on the updated TCI state of the P3 (e.g., the updated CSI-RS configuration).

The example techniques described herein provide advantages over some systems, for example, in which the UE 115-*b* may be unaware of whether the P2 report has been successfully received or decoded by the base station 105-*b*. For example, in some other systems, the UE 115-*b* may assume the P2 report has been successfully received or decoded by the base station 105-*b*, but the base station 105-*b* may have not received the P2 report. In such example cases, the UE 115-*b* and the base station 105-*b* may be operating according to different TCI state configurations. For example, in some other systems, the UE 115-*b* may transition to the different TCI state based on the assumption that the base station 105-*b* successfully received the P2 report, whereas the base station 105-*b* may have refrained from transitioning to the different TCI state (e.g., due to unsuccessful receipt or unsuccessful decoding of the P2 report).

Figure 4:
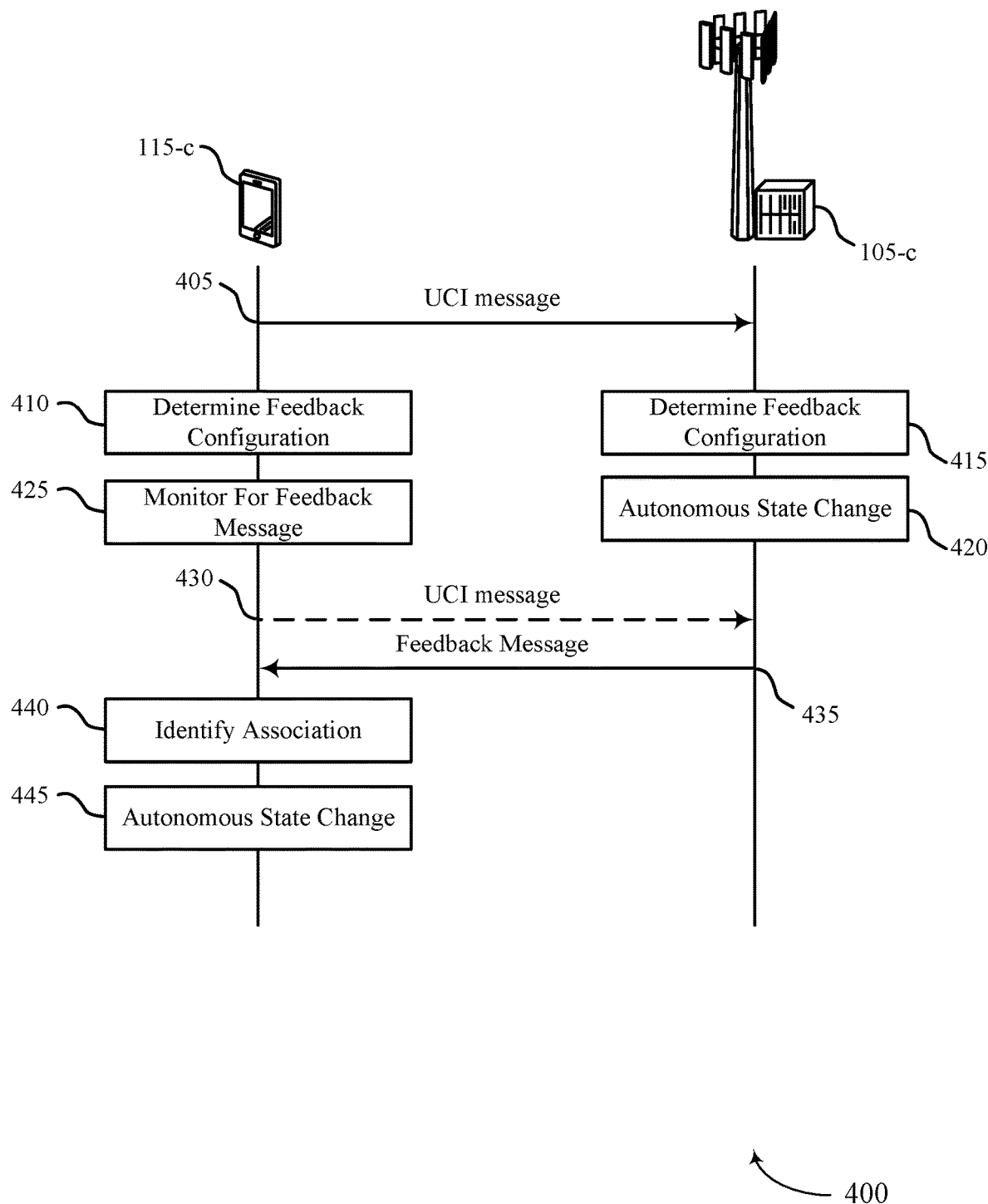
FIG. 4 illustrates an example of a process flow that supports feedback configuration for uplink control messages in accordance with aspects of the present disclosure.

FIG. 4 illustrates an example of a process flow 400 that supports feedback configuration for uplink control messages in accordance with aspects of the present disclosure. In some examples, process flow 400 may implement aspects of wireless communications systems 100 or 200. Additionally, process flow 400 may implement aspects of process flow 300. Further, process flow 400 may be implemented by a UE 115-*c* and a base station 105-*c*, which may be examples of a UE 115, UE 115-*a*, UE 115-*b*, base station 105, base station 105-*a*, and base station 105-*b* described with reference to FIGS. 1-3.

In the following description of the process flow 400, the operations between UE 115-*c* and base station 105-*c* may be transmitted in a different order than the order shown, or the operations performed by base station 105-*c* and UE 115-*c* may be performed in different orders or at different times. Certain operations may also be left out of the process flow 400, or other operations may be added to the process flow 400. It is to be understood that while base station 105-*c* and UE 115-*c* are shown performing a number of the operations of process flow 400, any wireless device may perform the operations shown.

At 405, the UE 115-*c* may transmit an UCI message in uplink control channel resources (e.g., PUCCH resources).

At 410, the UE 115-*c* may determine a feedback configuration corresponding to the UCI message based on a set of attributes of the UCI message. In some aspects, the feedback configuration may indicate whether the UCI message triggers a feedback message.

At 415, the base station 105-*c* may determine the feedback configuration corresponding to the UCI message based on the set of attributes of the UCI message. In an example, the set of attributes may include a format of the UCI message. In some examples, the set of attributes may include a payload size associated with the UCI message. In another example, the set of attributes may include a priority of the uplink control channel resources. In some aspects, the set of attributes may include a trigger condition for triggering an autonomous state change at the UE based on transmission of the UCI message. In some aspects, the set of attributes may include a dynamic indication that indicates the feedback configuration for the UCI message. In some other aspects, the set of attributes may include a scheduling type associated with the uplink control channel resources.

At 420, the base station 105-*c* may perform the autonomous state change based on receiving the UCI message. For example, the set of attributes of the UCI message may include a trigger condition for triggering an autonomous state change at the base station 105-*c*.

At 425, the UE 115-*c* may monitor for the feedback message responsive to the UCI message based on the feedback configuration.

In some aspects, at 430, the UE 115-*c* may retransmit the UCI message based on the monitoring and expiration of a timer.

At 435, the base station 105-*c* may transmit the feedback message based on the feedback configuration. In some examples, the base station 105-*c* may transmit the feedback message based on receiving the UCI message. At 435, the UE 115-*c* may receive the feedback message based on the monitoring. In some examples, the feedback message may include an indication of an association between the feedback message and the UCI message. For example, the indication may include bitmap information corresponding to of the uplink control channel resources.

At 440, the UE 115-*c* may identify the association between the feedback message and the UCI message based on a duration between transmitting the UCI message and receiving the feedback message.

At 445, the UE 115-*c* may perform the autonomous state change based on receiving the feedback message.

Figure 5:
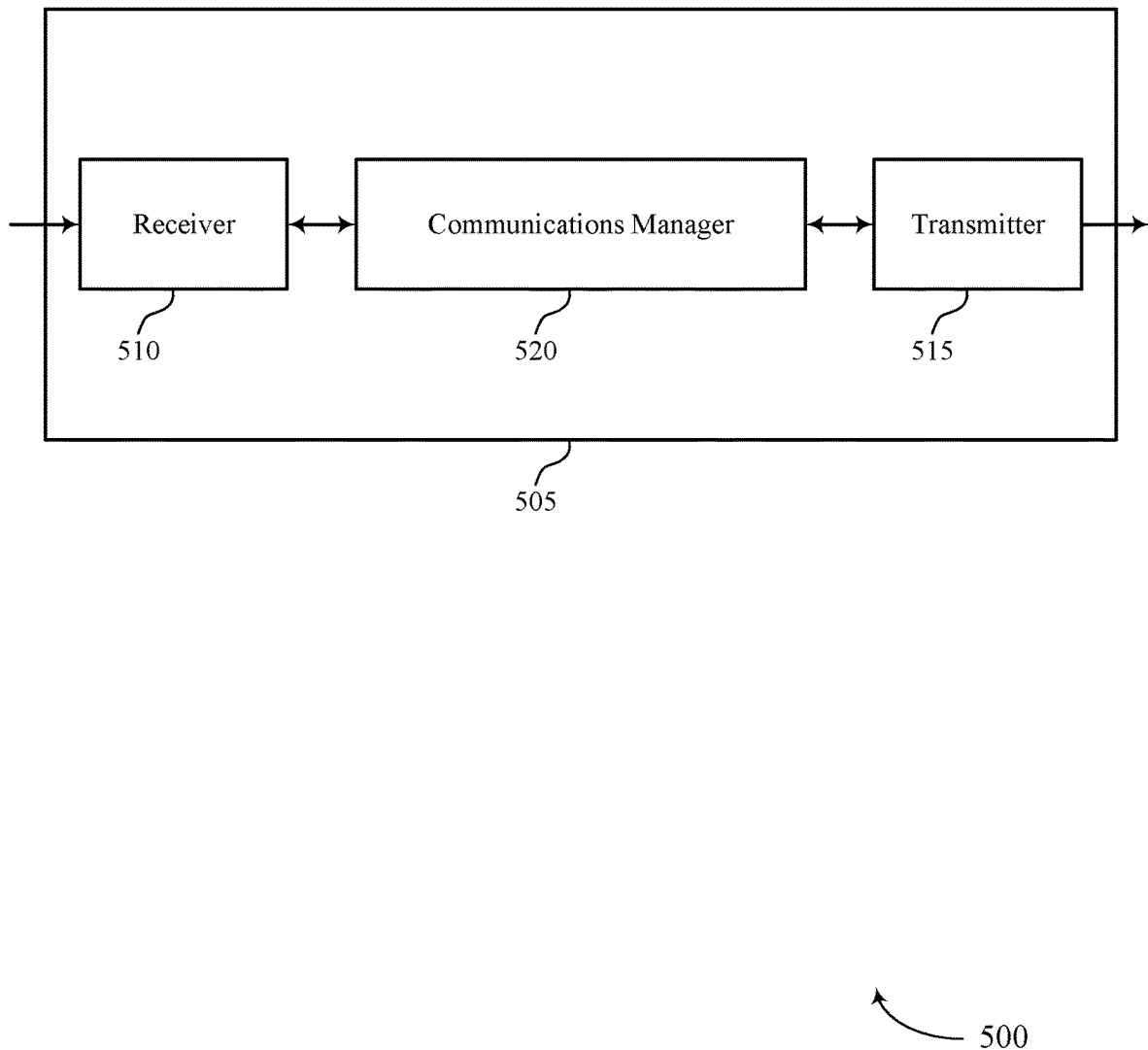
FIGS. 5 and 6 show block diagrams of devices that support feedback configuration for uplink control messages in accordance with aspects of the present disclosure.

FIG. 5 shows a block diagram 500 of a device 505 that supports feedback configuration for uplink control messages in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to feedback configuration for uplink control messages). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to feedback configuration for uplink control messages). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of feedback configuration for uplink control messages as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for transmitting an UCI message in uplink control channel resources. The communications manager 520 may be configured as or otherwise support a means for determining a feedback configuration corresponding to the UCI message based on a set of attributes of the UCI message, where the feedback configuration indicates whether the UCI message triggers a feedback message. The communications manager 520 may be configured as or otherwise support a means for monitoring for the feedback message responsive to the UCI message based on the feedback configuration.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for advantages such as reduced processing, reduced power consumption, and more efficient utilization of communication resources. One implementation may allow the device 505 to more efficiently determine whether the device 505 is to monitor for a feedback message, optimizing both processing and power overhead. In some examples, by identifying whether attributes of an UCI message (and a feedback configuration corresponding thereto) include a trigger condition for triggering an autonomous state change at the device 505, the device 505 may further achieve optimizations in determining whether to transition to a different state, reducing both processing and power overhead.

Figure 6:
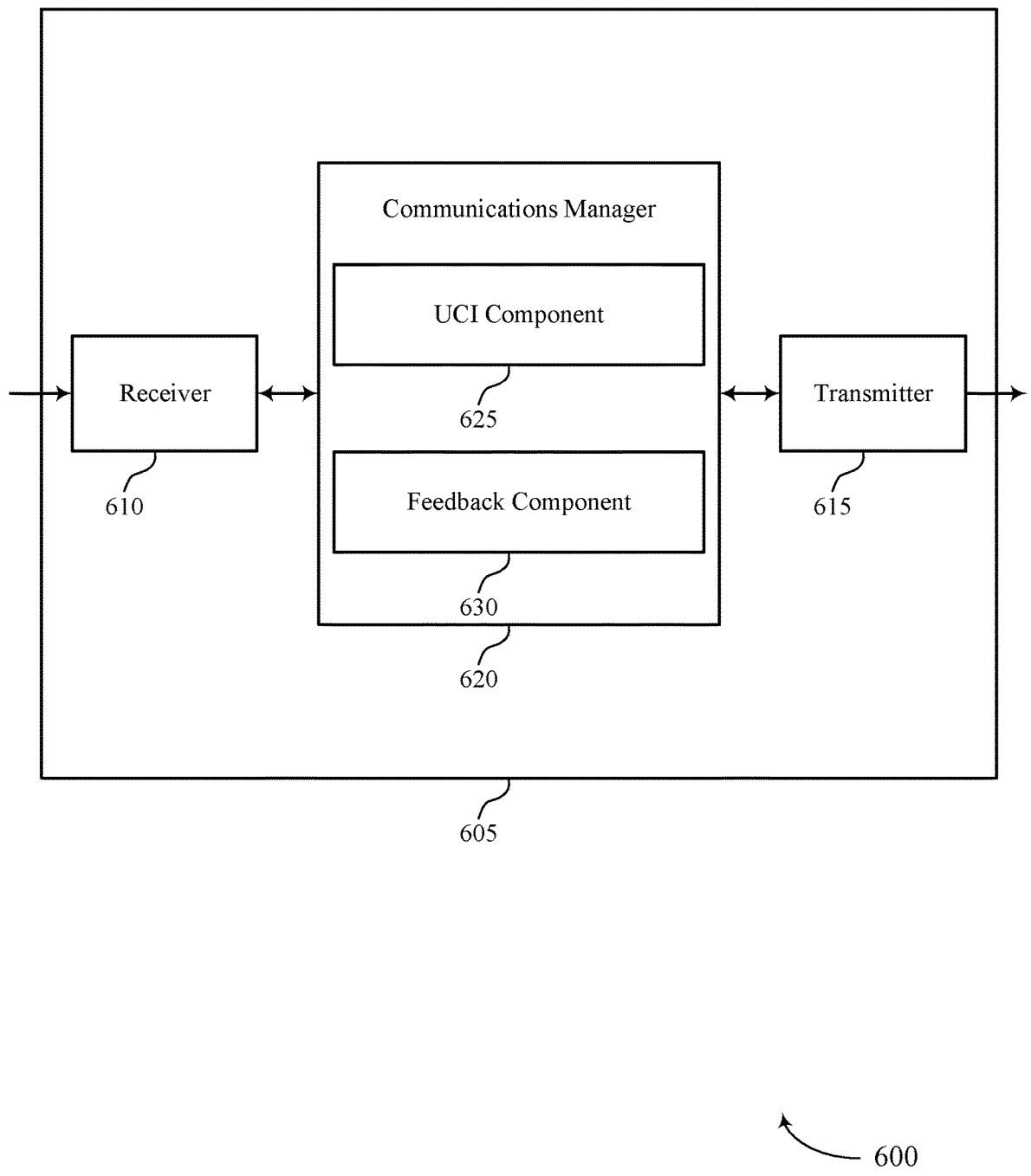

FIG. 6 shows a block diagram 600 of a device 605 that supports feedback configuration for uplink control messages in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to feedback configuration for uplink control messages). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to feedback configuration for uplink control messages). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of feedback configuration for uplink control messages as described herein. For example, the communications manager 620 may include a UCI component 625 a feedback component 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The UCI component 625 may be configured as or otherwise support a means for transmitting an UCI message in uplink control channel resources. The feedback component 630 may be configured as or otherwise support a means for determining a feedback configuration corresponding to the UCI message based on a set of attributes of the UCI message, where the feedback configuration indicates whether the UCI message triggers a feedback message. The feedback component 630 may be configured as or otherwise support a means for monitoring for the feedback message responsive to the UCI message based on the feedback configuration.

Figure 7:
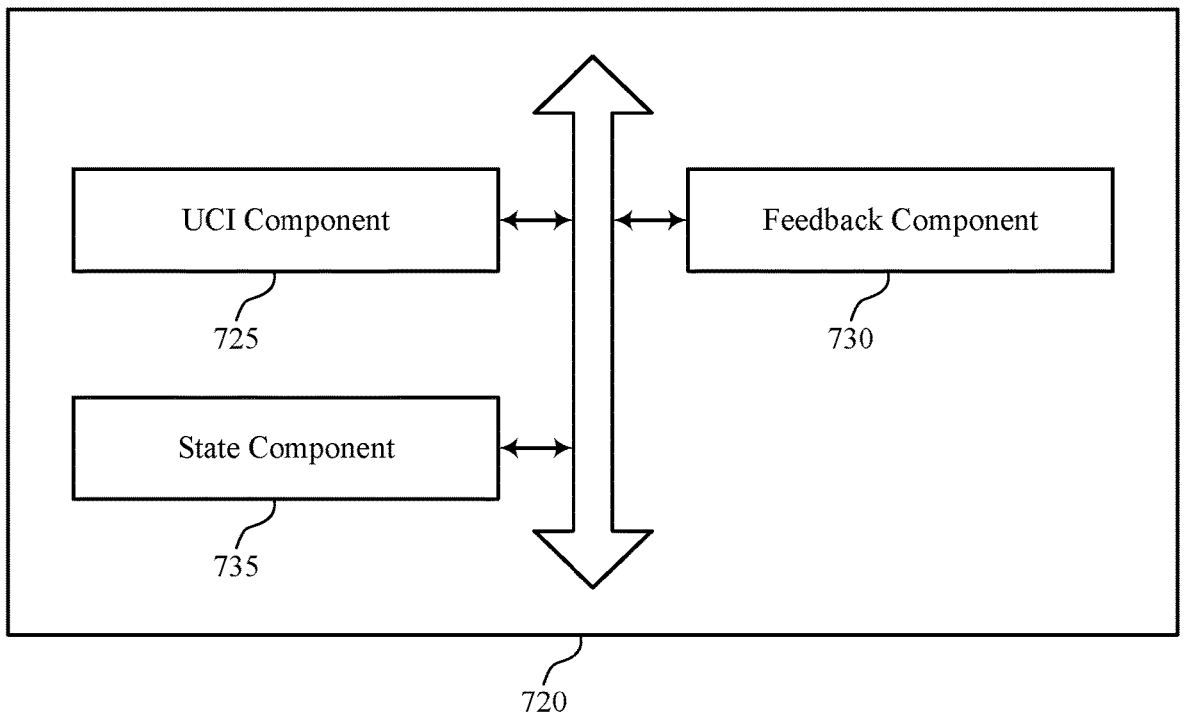
FIG. 7 shows a block diagram of a communications manager that supports feedback configuration for uplink control messages in accordance with aspects of the present disclosure.

FIG. 7 shows a block diagram 700 of a communications manager 720 that supports feedback configuration for uplink control messages in accordance with aspects of the present disclosure. The communications manager 720 may be an example of aspects of a communications manager 520, a communications manager 620, or both, as described herein. The communications manager 720, or various components thereof, may be an example of means for performing various aspects of feedback configuration for uplink control messages as described herein. For example, the communications manager 720 may include a UCI component 725, a feedback component 730, a state component 735, or any combination thereof. Each of these components may communicate, directly or indirectly, with one another (e.g., via one or more buses).

The communications manager 720 may support wireless communication at a UE in accordance with examples as disclosed herein. The UCI component 725 may be configured as or otherwise support a means for transmitting an UCI message in uplink control channel resources. The feedback component 730 may be configured as or otherwise support a means for determining a feedback configuration corresponding to the UCI message based on a set of attributes of the UCI message, where the feedback configuration indicates whether the UCI message triggers a feedback message. In some examples, the feedback component 730 may be configured as or otherwise support a means for monitoring for the feedback message responsive to the UCI message based on the feedback configuration.

In some examples, the set of attributes includes a format of the UCI message. In some examples, the set of attributes includes a payload size associated with the UCI message. In some examples, the set of attributes includes a priority of the uplink control channel resources. In some examples, the set of attributes includes a trigger condition for triggering an autonomous state change at the UE based on transmission of the UCI message. In some examples, the set of attributes includes a dynamic indication that indicates the feedback configuration for the UCI message. In some examples, the set of attributes includes a scheduling type associated with the uplink control channel resources.

In some examples, the feedback message includes an indication of an association between the feedback message and the UCI message. In some examples, the indication of the association between the feedback message and the UCI message includes bitmap information corresponding to the uplink control channel resources.

In some examples, the feedback component 730 may be configured as or otherwise support a means for receiving the feedback message based on the monitoring. In some examples, the state component 735 may be configured as or otherwise support a means for performing the autonomous state change based on receiving the feedback message. In some examples, the feedback component 730 may be configured as or otherwise support a means for retransmitting the UCI message based on the monitoring and expiration of a timer. In some examples, the feedback component 730 may be configured as or otherwise support a means for receiving the feedback message based on the monitoring. In some examples, the feedback component 730 may be configured as or otherwise support a means for identifying an association between the feedback message and the UCI message based on a duration between transmitting the UCI message and receiving the feedback message.

In some examples, the feedback component 730 may be configured as or otherwise support a means for receiving the feedback message in a DCI message over downlink control channel resources. In some examples, the feedback component 730 may be configured as or otherwise support a means for where bitmap information in a field of the DCI message includes an indication of an association between the feedback message and the UCI message.

Figure 8:
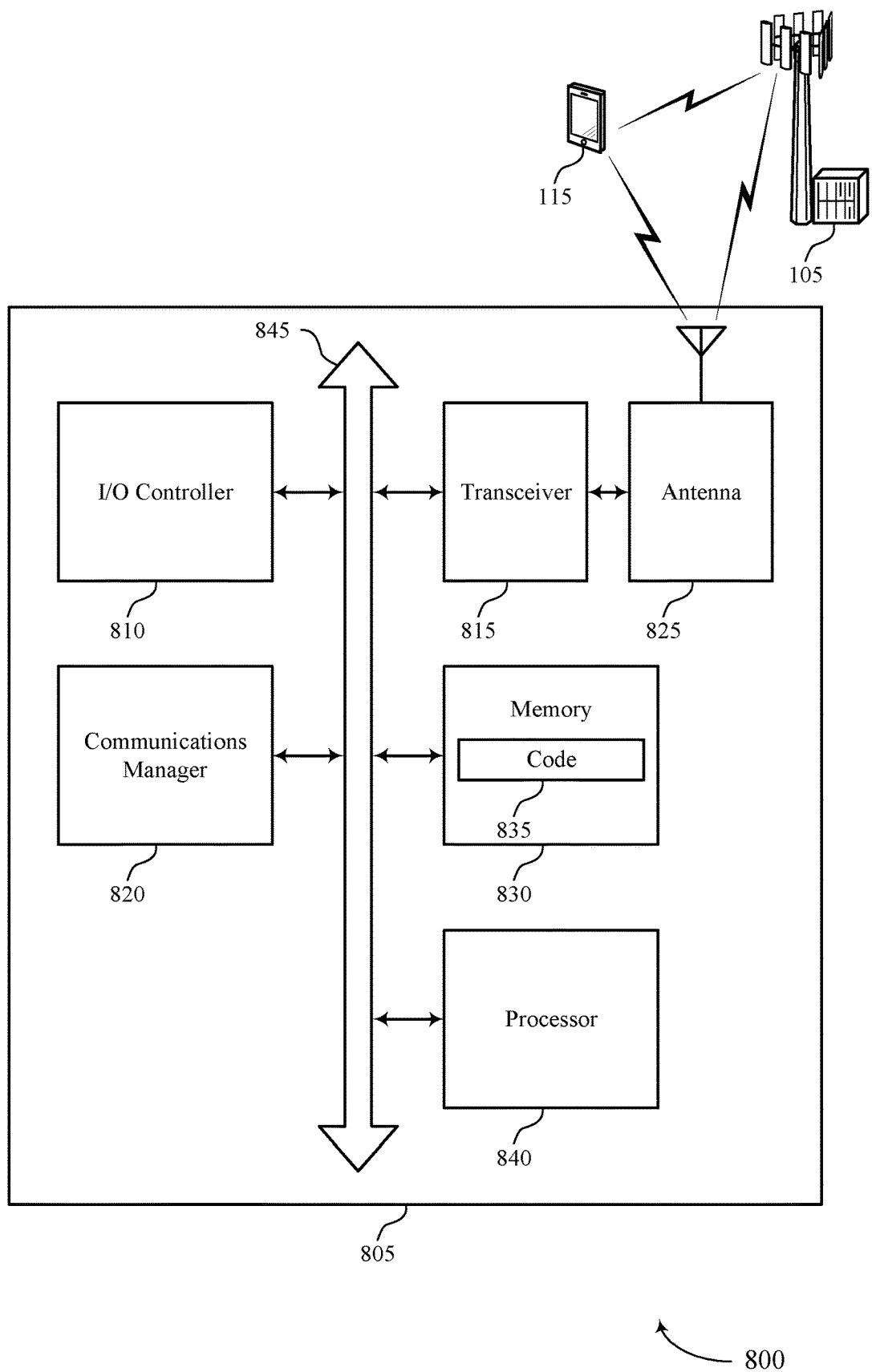
FIG. 8 shows a diagram of a system including a device that supports feedback configuration for uplink control messages in accordance with aspects of the present disclosure.

FIG. 8 shows a diagram of a system 800 including a device 805 that supports feedback configuration for uplink control messages in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting feedback configuration for uplink control messages). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for transmitting an UCI message in uplink control channel resources. The communications manager 820 may be configured as or otherwise support a means for determining a feedback configuration corresponding to the UCI message based on a set of attributes of the UCI message, where the feedback configuration indicates whether the UCI message triggers a feedback message. The communications manager 820 may be configured as or otherwise support a means for monitoring for the feedback message responsive to the UCI message based on the feedback configuration.

By including or configuring the communications manager 820 in accordance with examples as described herein, the device 805 may support techniques for advantages such as reduced processing, reduced power consumption, and more efficient utilization of communication resources. One implementation may allow the device 805 to more efficiently determine whether the device 805 is to monitor for a feedback message, optimizing both processing and power overhead. In some examples, by identifying whether attributes of an UCI message (and a feedback configuration corresponding thereto) include a trigger condition for triggering an autonomous state change at the device 805, the device 805 may further achieve optimizations in determining whether to transition to a different state, reducing both processing and power overhead.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of feedback configuration for uplink control messages as described herein, or the processor 840 and the memory 830 may be otherwise configured to perform or support such operations.

Figure 9:
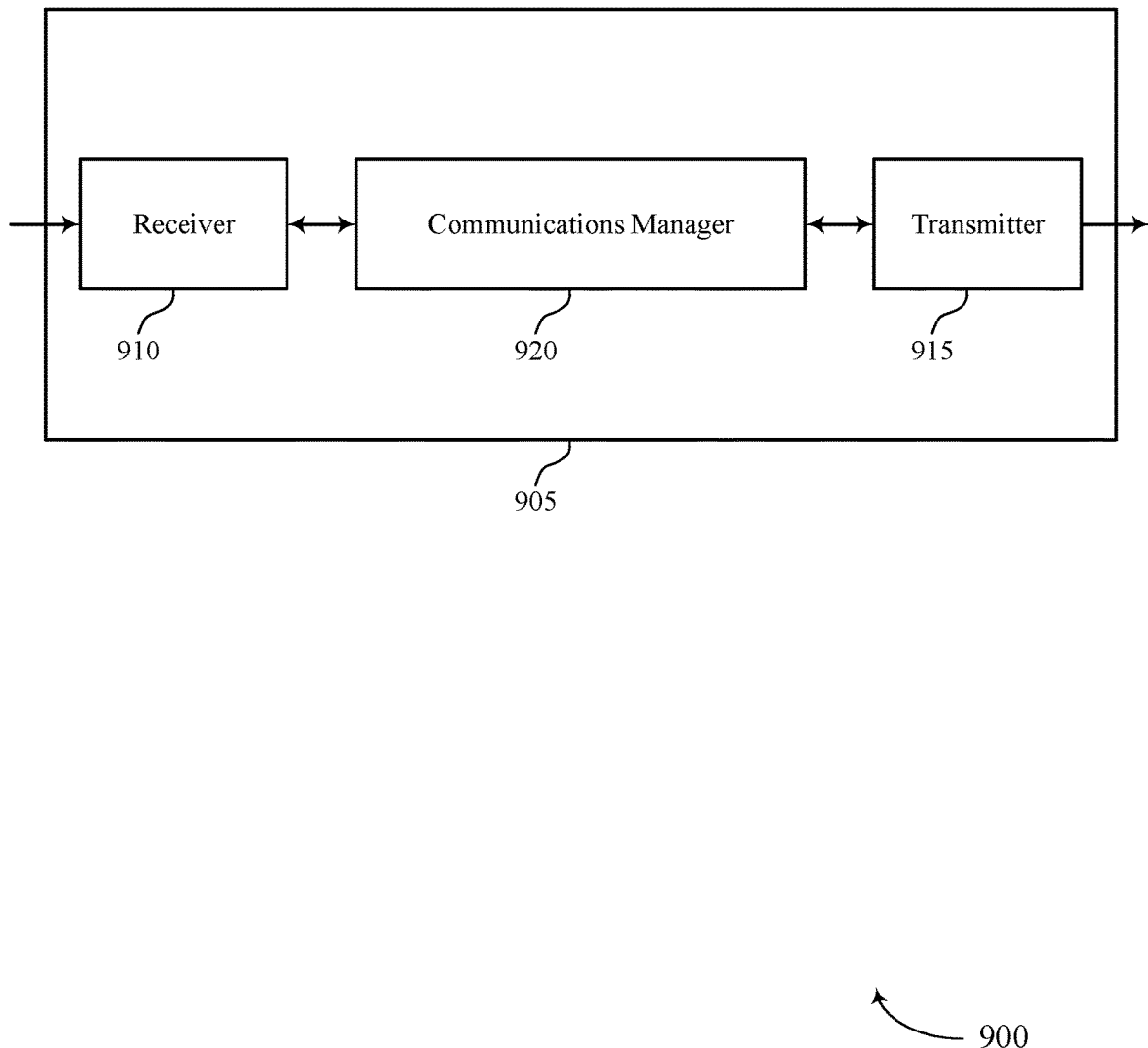
FIGS. 9 and 10 show block diagrams of devices that support feedback configuration for uplink control messages in accordance with aspects of the present disclosure.

FIG. 9 shows a block diagram 900 of a device 905 that supports feedback configuration for uplink control messages in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to feedback configuration for uplink control messages). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to feedback configuration for uplink control messages). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of feedback configuration for uplink control messages as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for receiving an UCI message in uplink control channel resources. The communications manager 920 may be configured as or otherwise support a means for determining a feedback configuration corresponding to the UCI message based on a set of attributes of the UCI message, where the feedback configuration indicates whether the UCI message triggers a feedback message. The communications manager 920 may be configured as or otherwise support a means for transmitting the feedback message responsive to the UCI message based on the feedback configuration.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for advantages such as reduced processing, reduced power consumption, and more efficient utilization of communication resources. One implementation may allow the device 905 to more efficiently determine whether the device 905 is to transmit a feedback message, optimizing both processing and power overhead. In some examples, by identifying whether attributes of an UCI message (and a feedback configuration corresponding thereto) include a trigger condition for triggering an autonomous state change at the device 905, the device 905 may further achieve optimizations in determining whether to transition to a different state, reducing both processing and power overhead.

Figure 10:
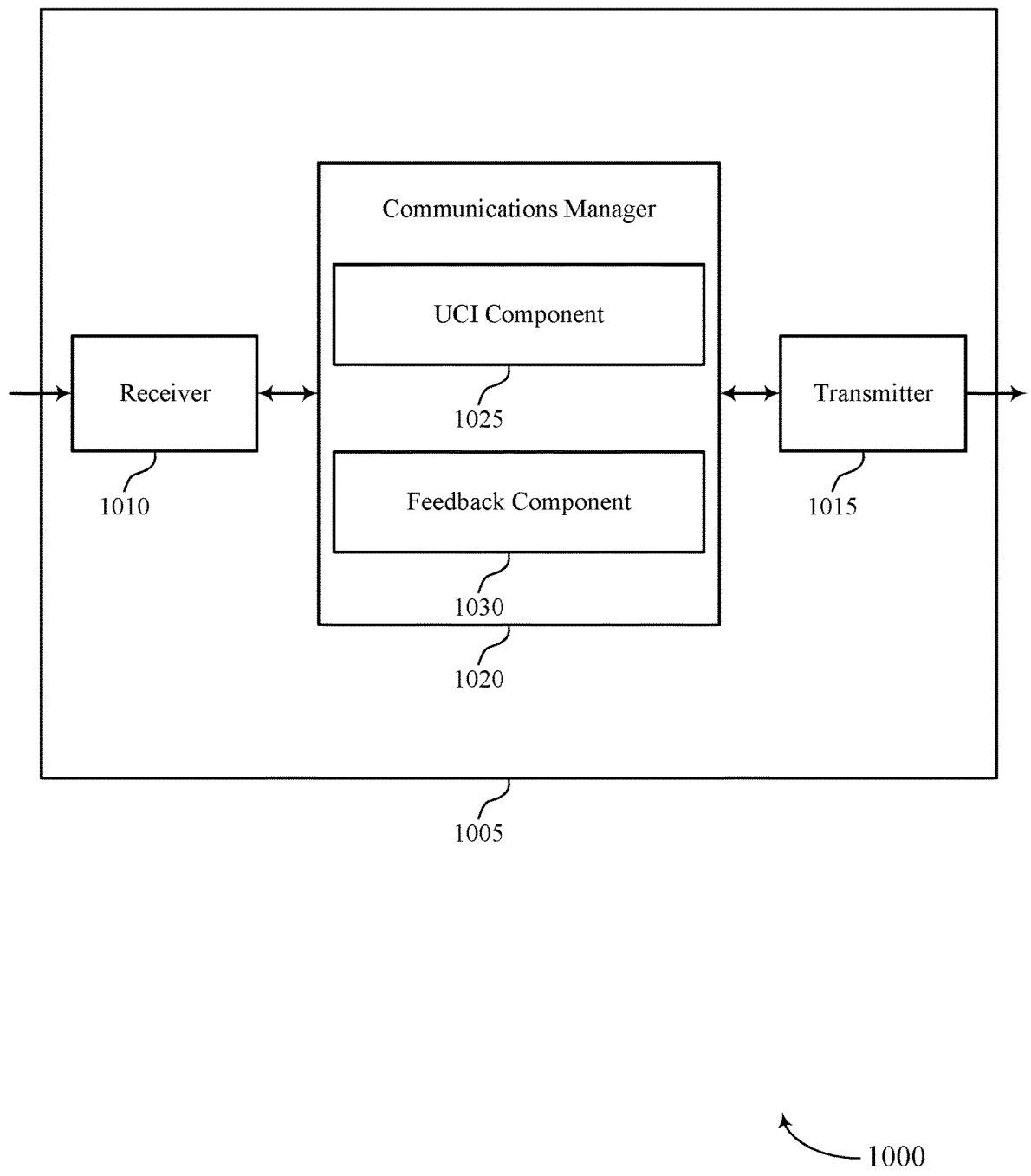

FIG. 10 shows a block diagram 1000 of a device 1005 that supports feedback configuration for uplink control messages in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to feedback configuration for uplink control messages). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to feedback configuration for uplink control messages). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of feedback configuration for uplink control messages as described herein. For example, the communications manager 1020 may include a UCI component 1025 a feedback component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The UCI component 1025 may be configured as or otherwise support a means for receiving an UCI message in uplink control channel resources. The feedback component 1030 may be configured as or otherwise support a means for determining a feedback configuration corresponding to the UCI message based on a set of attributes of the UCI message, where the feedback configuration indicates whether the UCI message triggers a feedback message. The feedback component 1030 may be configured as or otherwise support a means for transmitting the feedback message responsive to the UCI message based on the feedback configuration.

Figure 11:
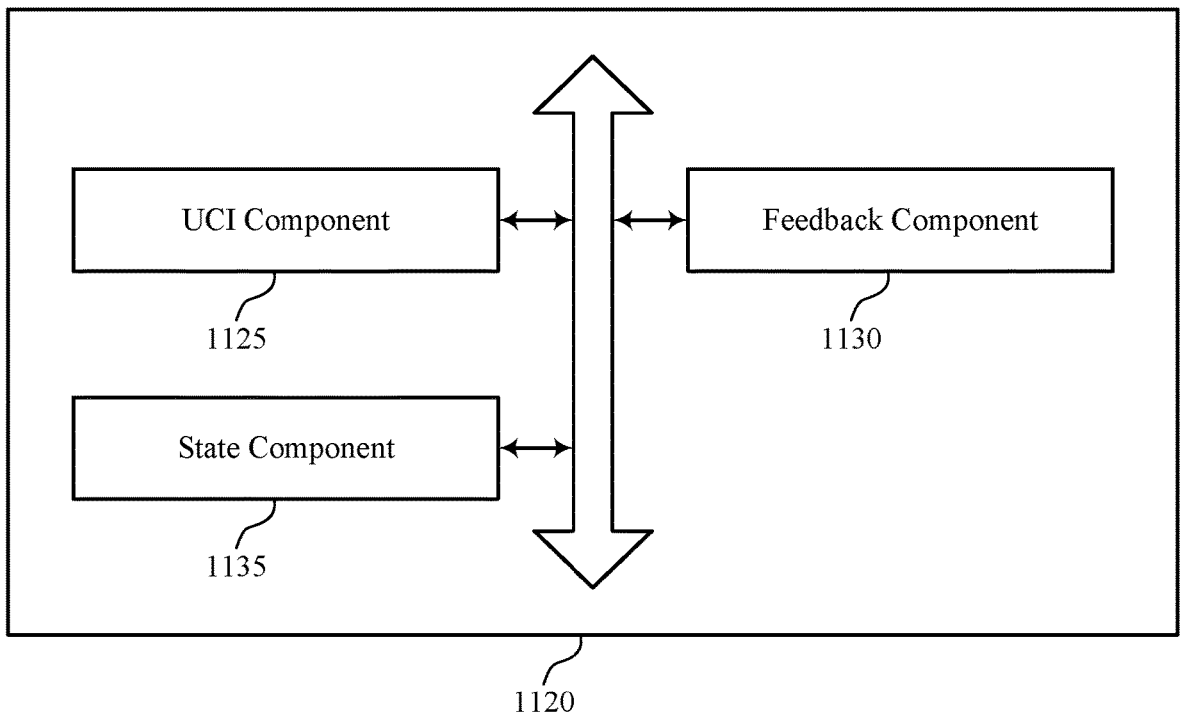
FIG. 11 shows a block diagram of a communications manager that supports feedback configuration for uplink control messages in accordance with aspects of the present disclosure.

FIG. 11 shows a block diagram 1100 of a communications manager 1120 that supports feedback configuration for uplink control messages in accordance with aspects of the present disclosure. The communications manager 1120 may be an example of aspects of a communications manager 920, a communications manager 1020, or both, as described herein. The communications manager 1120, or various components thereof, may be an example of means for performing various aspects of feedback configuration for uplink control messages as described herein. For example, the communications manager 1120 may include a UCI component 1125, a feedback component 1130, a state component 1135, or any combination thereof. Each of these components may communicate, directly or indirectly, with one another (e.g., via one or more buses).

The communications manager 1120 may support wireless communication at a base station in accordance with examples as disclosed herein. The UCI component 1125 may be configured as or otherwise support a means for receiving an UCI message in uplink control channel resources. The feedback component 1130 may be configured as or otherwise support a means for determining a feedback configuration corresponding to the UCI message based on a set of attributes of the UCI message, where the feedback configuration indicates whether the UCI message triggers a feedback message. In some examples, the feedback component 1130 may be configured as or otherwise support a means for transmitting the feedback message responsive to the UCI message based on the feedback configuration.

In some examples, the set of attributes includes a format of the UCI message.

In some examples, the set of attributes includes a payload size associated with the UCI message. In some examples, the set of attributes includes a priority of the uplink control channel resources. In some examples, the set of attributes includes a trigger condition for triggering an autonomous state change at the base station. In some examples, the set of attributes includes a dynamic indication that indicates the feedback configuration for the UCI message. In some examples, the set of attributes includes a scheduling type associated with the uplink control channel resources.

In some examples, the feedback message includes an indication of an association between the feedback message and the UCI message. In some examples, the indication of the association between the feedback message and the UCI message includes bitmap information corresponding to of the uplink control channel resources.

In some examples, the feedback component 1130 may be configured as or otherwise support a means for transmitting the feedback message based on receiving the UCI message. In some examples, the state component 1135 may be configured as or otherwise support a means for performing the autonomous state change based on receiving the UCI message. In some examples, the UCI component 1125 may be configured as or otherwise support a means for receiving a retransmission of the UCI message based on expiration of a timer.

In some examples, the feedback component 1130 may be configured as or otherwise support a means for transmitting the feedback message in a DCI message over downlink control channel resources. In some examples, the feedback component 1130 may be configured as or otherwise support a means for where bitmap information in a field of the DCI message includes an indication of an association between the feedback message and the UCI message.

Figure 12:
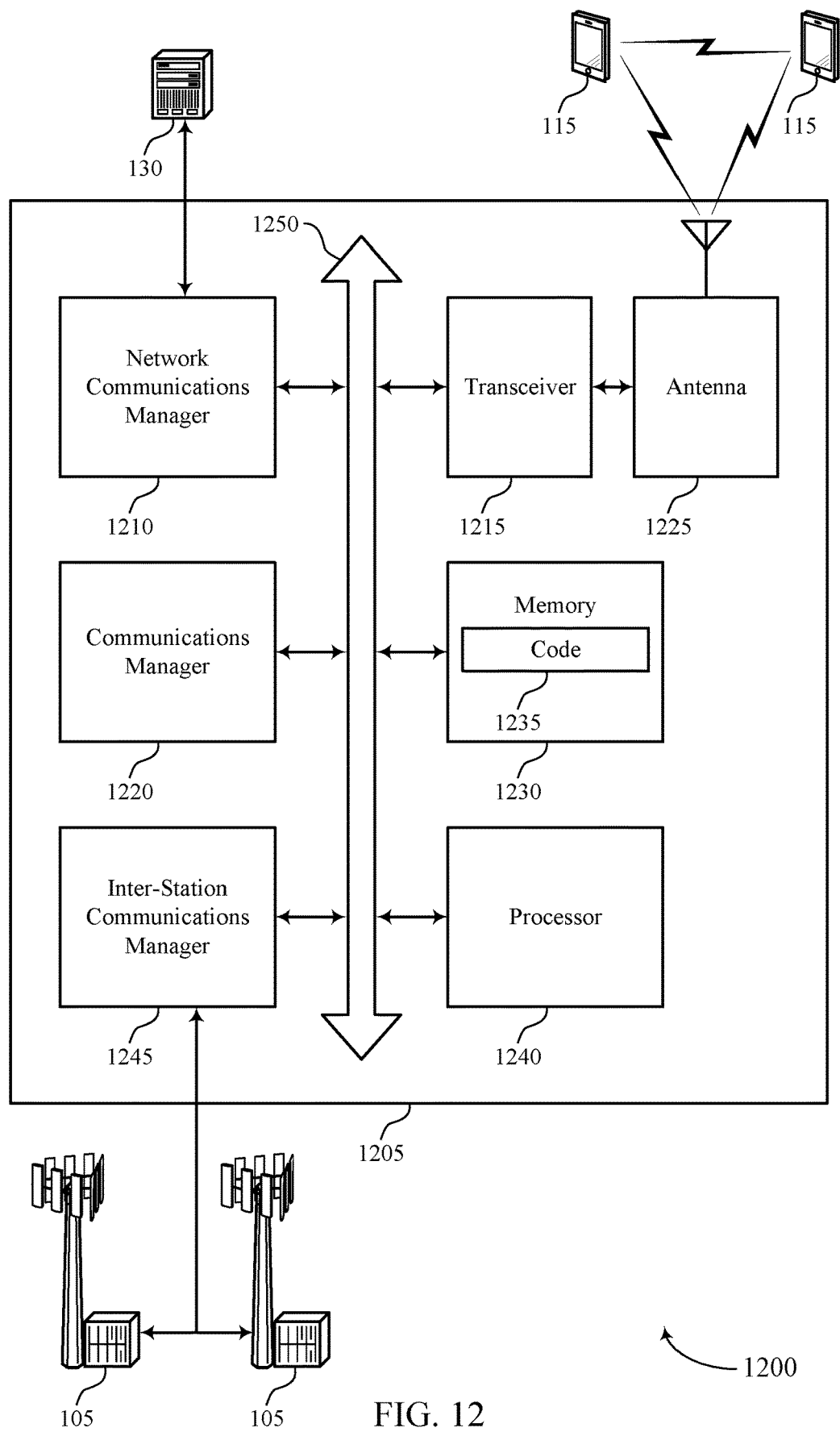
FIG. 12 shows a diagram of a system including a device that supports feedback configuration for uplink control messages in accordance with aspects of the present disclosure.

FIG. 12 shows a diagram of a system 1200 including a device 1205 that supports feedback configuration for uplink control messages in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory.

In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting feedback configuration for uplink control messages). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for receiving an UCI message in uplink control channel resources. The communications manager 1220 may be configured as or otherwise support a means for determining a feedback configuration corresponding to the UCI message based on a set of attributes of the UCI message, where the feedback configuration indicates whether the UCI message triggers a feedback message. The communications manager 1220 may be configured as or otherwise support a means for transmitting the feedback message responsive to the UCI message based on the feedback configuration.

By including or configuring the communications manager 1220 in accordance with examples as described herein, the device 1205 may support techniques for advantages such as reduced processing, reduced power consumption, and more efficient utilization of communication resources. One implementation may allow the device 1205 to more efficiently determine whether the device 1205 is to transmit a feedback message, optimizing both processing and power overhead. In some examples, by identifying whether attributes of an UCI message (and a feedback configuration corresponding thereto) include a trigger condition for triggering an autonomous state change at the device 1205, the device 1205 may further achieve optimizations in determining whether to transition to a different state, reducing both processing and power overhead.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of feedback configuration for uplink control messages as described herein, or the processor 1240 and the memory 1230 may be otherwise configured to perform or support such operations.

Figure 13:
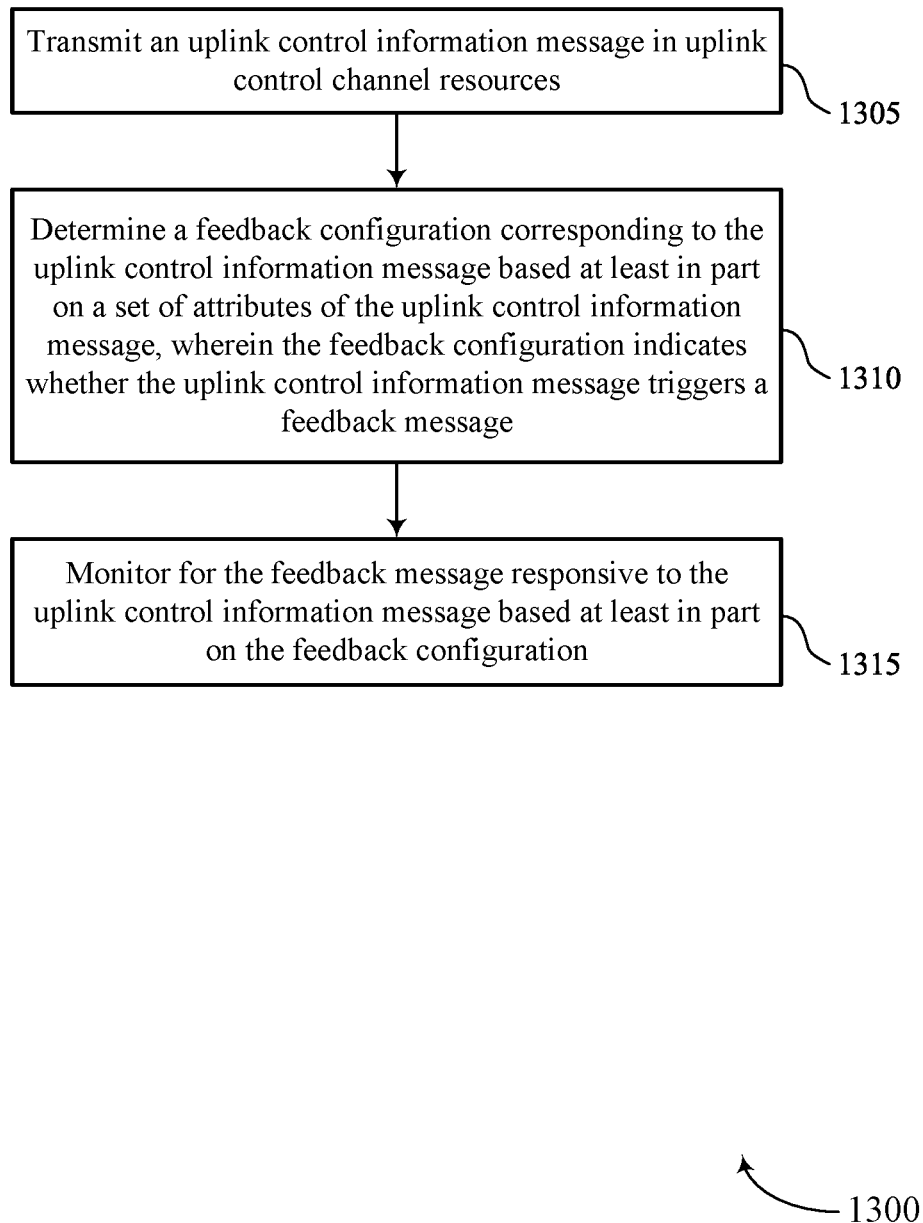
FIGS. 13 through 16 show flowcharts illustrating methods that support feedback configuration for uplink control messages in accordance with aspects of the present disclosure.

FIG. 13 shows a flowchart illustrating a method 1300 that supports feedback configuration for uplink control messages in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting an UCI message in uplink control channel resources. The operations of 1305 may be performed in accordance with examples as disclosed herein. In some examples, aspects of the operations of 1305 may be performed by a UCI component 725 as described with reference to FIG. 7.

At 1310, the method may include determining a feedback configuration corresponding to the UCI message based on a set of attributes of the UCI message, where the feedback configuration indicates whether the UCI message triggers a feedback message. The operations of 1310 may be performed in accordance with examples as disclosed herein. In some examples, aspects of the operations of 1310 may be performed by a feedback component 730 as described with reference to FIG. 7.

At 1315, the method may include monitoring for the feedback message responsive to the UCI message based on the feedback configuration. The operations of 1315 may be performed in accordance with examples as disclosed herein. In some examples, aspects of the operations of 1315 may be performed by a feedback component 730 as described with reference to FIG. 7.

Figure 14:
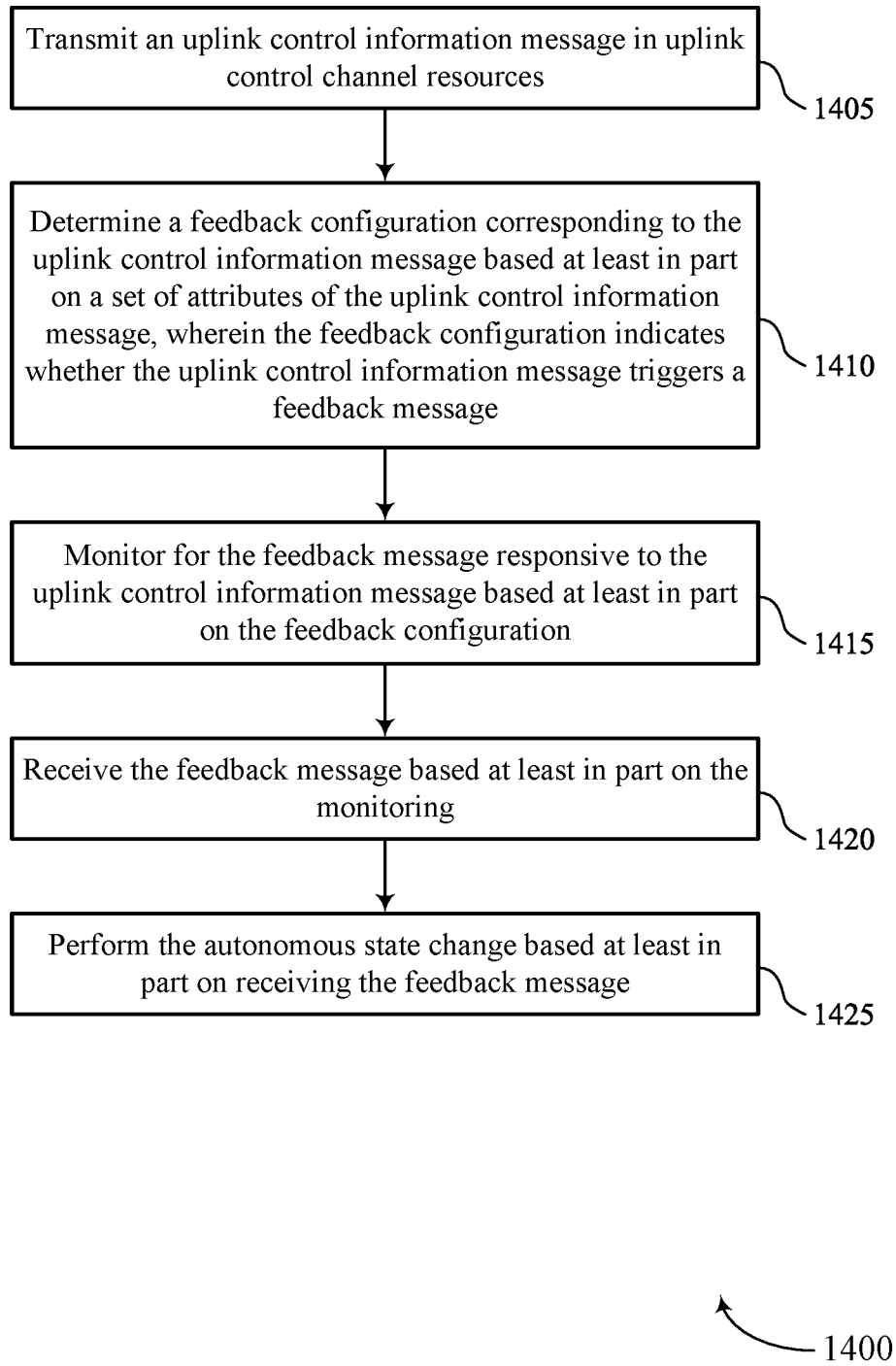

FIG. 14 shows a flowchart illustrating a method 1400 that supports feedback configuration for uplink control messages in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting an UCI message in uplink control channel resources. The operations of 1405 may be performed in accordance with examples as disclosed herein. In some examples, aspects of the operations of 1405 may be performed by a UCI component 725 as described with reference to FIG. 7.

At 1410, the method may include determining a feedback configuration corresponding to the UCI message based on a set of attributes of the UCI message, where the feedback configuration indicates whether the UCI message triggers a feedback message. The operations of 1410 may be performed in accordance with examples as disclosed herein. In some examples, aspects of the operations of 1410 may be performed by a feedback component 730 as described with reference to FIG. 7.

At 1415, the method may include monitoring for the feedback message responsive to the UCI message based on the feedback configuration. The operations of 1415 may be performed in accordance with examples as disclosed herein. In some examples, aspects of the operations of 1415 may be performed by a feedback component 730 as described with reference to FIG. 7.

At 1420, the method may include receiving the feedback message based on the monitoring. The operations of 1420 may be performed in accordance with examples as disclosed herein. In some examples, aspects of the operations of 1420 may be performed by a feedback component 730 as described with reference to FIG. 7.

At 1425, the method may include performing the autonomous state change based on receiving the feedback message. The operations of 1425 may be performed in accordance with examples as disclosed herein. In some examples, aspects of the operations of 1425 may be performed by a state component 735 as described with reference to FIG. 7.

Figure 15:
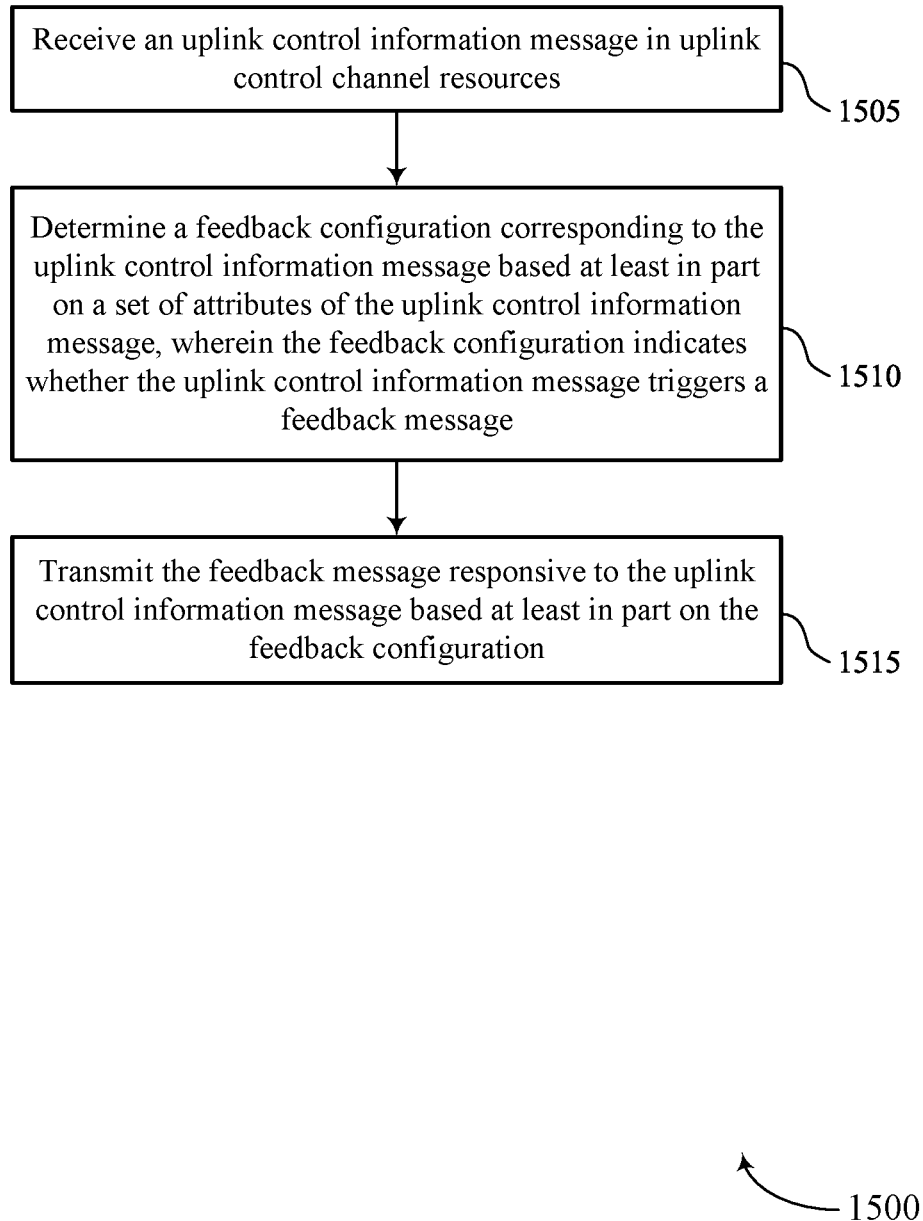

FIG. 15 shows a flowchart illustrating a method 1500 that supports feedback configuration for uplink control messages in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include receiving an UCI message in uplink control channel resources. The operations of 1505 may be performed in accordance with examples as disclosed herein. In some examples, aspects of the operations of 1505 may be performed by a UCI component 1125 as described with reference to FIG. 11.

At 1510, the method may include determining a feedback configuration corresponding to the UCI message based on a set of attributes of the UCI message, where the feedback configuration indicates whether the UCI message triggers a feedback message. The operations of 1510 may be performed in accordance with examples as disclosed herein. In some examples, aspects of the operations of 1510 may be performed by a feedback component 1130 as described with reference to FIG. 11.

At 1515, the method may include transmitting the feedback message responsive to the UCI message based on the feedback configuration. The operations of 1515 may be performed in accordance with examples as disclosed herein. In some examples, aspects of the operations of 1515 may be performed by a feedback component 1130 as described with reference to FIG. 11.

Figure 16:
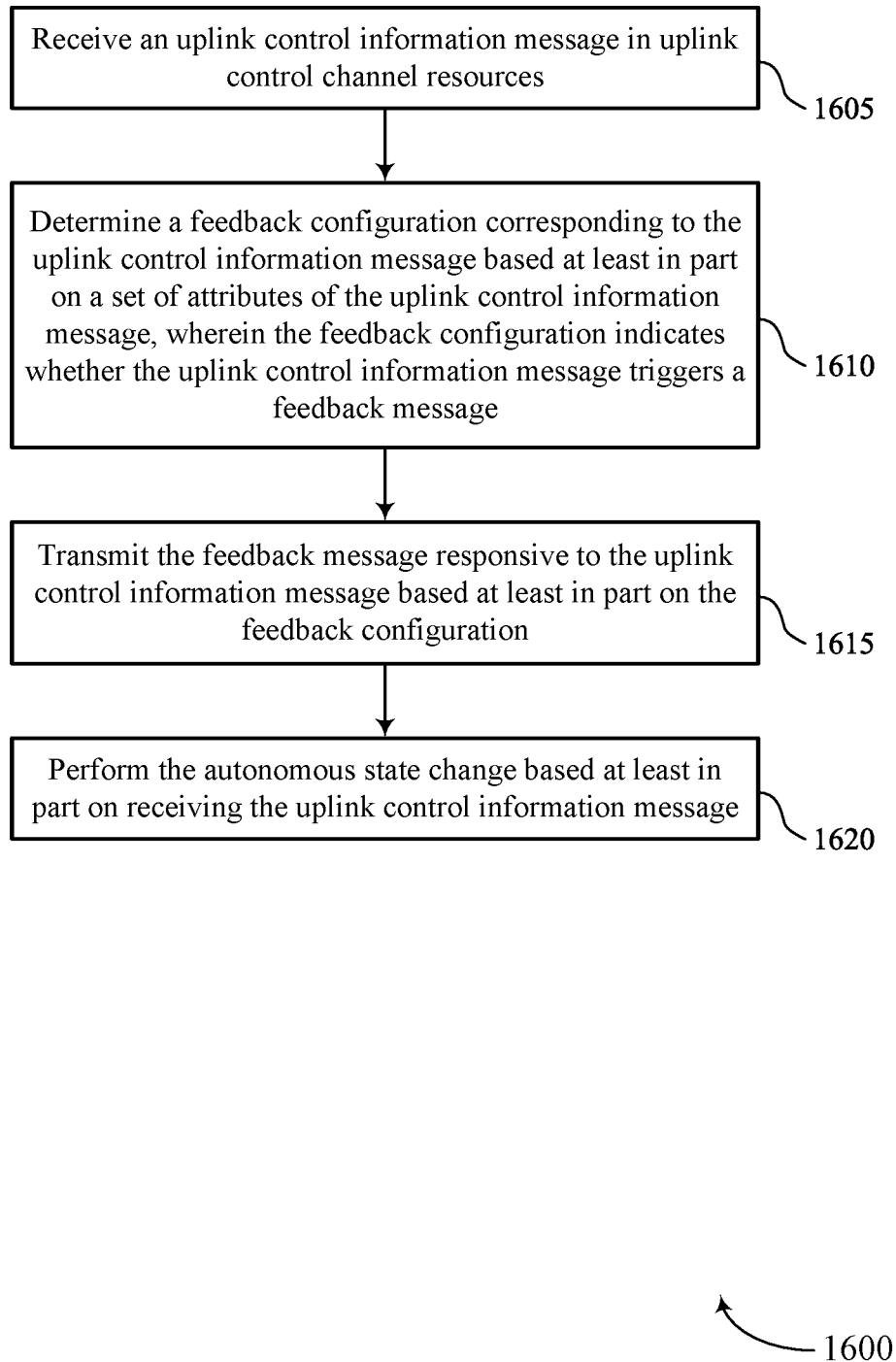

FIG. 16 shows a flowchart illustrating a method 1600 that supports feedback configuration for uplink control messages in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving an UCI message in uplink control channel resources. The operations of 1605 may be performed in accordance with examples as disclosed herein. In some examples, aspects of the operations of 1605 may be performed by a UCI component 1125 as described with reference to FIG. 11.

At 1610, the method may include determining a feedback configuration corresponding to the UCI message based on a set of attributes of the UCI message, where the feedback configuration indicates whether the UCI message triggers a feedback message. The operations of 1610 may be performed in accordance with examples as disclosed herein. In some examples, aspects of the operations of 1610 may be performed by a feedback component 1130 as described with reference to FIG. 11.

At 1615, the method may include transmitting the feedback message responsive to the UCI message based on the feedback configuration. In some examples, the method may include transmitting the feedback message based on receiving the UCI message. The operations of 1615 may be performed in accordance with examples as disclosed herein. In some examples, aspects of the operations of 1615 may be performed by a feedback component 1130 as described with reference to FIG. 11.

At 1620, the method may include performing the autonomous state change based on receiving the UCI message. The operations of 1620 may be performed in accordance with examples as disclosed herein. In some examples, aspects of the operations of 1620 may be performed by a state component 1135 as described with reference to FIG. 11.

The following provides an overview of aspects of the present disclosure:

Aspect 1: A method for wireless communication at a UE, comprising: transmitting an uplink control information message in UCI resources; determining a feedback configuration corresponding to the uplink control information message based at least in part on a set of attributes of the uplink control information message, wherein the feedback configuration indicates whether the uplink control information message triggers a feedback message; and monitoring for the feedback message responsive to the uplink control information message based at least in part on the feedback configuration.

Aspect 2: The method of aspect 1, wherein the set of attributes comprises a format of the uplink control information message.

Aspect 3: The method of any of aspects 1 through 2, wherein the set of attributes comprises a payload size associated with the uplink control information message.

Aspect 4: The method of any of aspects 1 through 3, wherein the set of attributes comprises a priority of the UCI resources.

Aspect 5: The method of any of aspects 1 through 4, wherein the set of attributes comprises a trigger condition for triggering an autonomous state change at the UE based at least in part on transmission of the uplink control information message.

Aspect 6: The method of aspect 5, further comprising: receiving the feedback message based at least in part on the monitoring; and performing the autonomous state change based at least in part on receiving the feedback message.

Aspect 7: The method of any of aspects 1 through 6, wherein the set of attributes comprises a dynamic indication that indicates the feedback configuration for the uplink control information message.

Aspect 8: The method of any of aspects 1 through 7, wherein the set of attributes comprises a scheduling type associated with the UCI resources.

Aspect 9: The method of any of aspects 1 through 8, further comprising: retransmitting the uplink control information message based at least in part on the monitoring and expiration of a timer.

Aspect 10: The method of any of aspects 1 through 9, wherein the feedback message comprises an indication of an association between the feedback message and the uplink control information message.

Aspect 11: The method of aspect 10, wherein the indication of the association between the feedback message and the uplink control information message comprises bitmap information corresponding to the UCI resources.

Aspect 12: The method of any of aspects 1 through 11, further comprising: receiving the feedback message based at least in part on the monitoring; and identifying an association between the feedback message and the uplink control information message based at least in part on a duration between transmitting the uplink control information message and receiving the feedback message.

Aspect 13: The method of any of aspects 1 through 12, further comprising: receiving the feedback message in a DCI message over downlink control channel resources, wherein bitmap information in a field of the DCI message comprises an indication of an association between the feedback message and the uplink control information message.

Aspect 14: A method for wireless communication at a base station, comprising: receiving an uplink control information message in UCI resources; determining a feedback configuration corresponding to the uplink control information message based at least in part on a set of attributes of the uplink control information message, wherein the feedback configuration indicates whether the uplink control information message triggers a feedback message; and transmitting the feedback message responsive to the uplink control information message based at least in part on the feedback configuration.

Aspect 15: The method of aspect 14, wherein the set of attributes comprises a format of the uplink control information message.

Aspect 16: The method of any of aspects 14 through 15, wherein the set of attributes comprises a payload size associated with the uplink control information message.

Aspect 17: The method of any of aspects 14 through 16, wherein the set of attributes comprises a priority of the UCI resources.

Aspect 18: The method of any of aspects 14 through 17, wherein the set of attributes comprises a trigger condition for triggering an autonomous state change at the base station.

Aspect 19: The method of aspect 18, further comprising: transmitting the feedback message based at least in part on receiving the uplink control information message; and performing the autonomous state change based at least in part on receiving the uplink control information message.

Aspect 20: The method of any of aspects 14 through 19, wherein the set of attributes comprises a dynamic indication that indicates the feedback configuration for the uplink control information message.

Aspect 21: The method of any of aspects 14 through 20, wherein the set of attributes comprises a scheduling type associated with the UCI resources.

Aspect 22: The method of any of aspects 14 through 21, further comprising: receiving a retransmission of the uplink control information message based at least in part on expiration of a timer.

Aspect 23: The method of any of aspects 14 through 22, wherein the feedback message comprises an indication of an association between the feedback message and the uplink control information message.

Aspect 24: The method of aspect 23, wherein the indication of the association between the feedback message and the uplink control information message comprises bitmap information corresponding to of the UCI resources.

Aspect 25: The method of any of aspects 14 through 24, further comprising: transmitting the feedback message in a DCI message over downlink control channel resources, wherein bitmap information in a field of the DCI message comprises an indication of an association between the feedback message and the uplink control information message.

Aspect 26: An apparatus for wireless communication at a UE, comprising a processor; memory coupled with the processor; and instructions stored in the memory and executable by the processor to cause the apparatus to perform a method of any of aspects 1 through 13.

Aspect 27: An apparatus for wireless communication at a UE, comprising at least one means for performing a method of any of aspects 1 through 13.

Aspect 28: A non-transitory computer-readable medium storing code for wireless communication at a UE, the code comprising instructions executable by a processor to perform a method of any of aspects 1 through 13.

Aspect 29: An apparatus for wireless communication at a base station, comprising a processor; memory coupled with the processor; and instructions stored in the memory and executable by the processor to cause the apparatus to perform a method of any of aspects 14 through 25.

Aspect 30: An apparatus for wireless communication at a base station, comprising at least one means for performing a method of any of aspects 14 through 25.

Aspect 31: A non-transitory computer-readable medium storing code for wireless communication at a base station, the code comprising instructions executable by a processor to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   transmitting an uplink control information message in uplink control channel resources;
   determining a feedback configuration corresponding to the uplink control information message based at least in part on a set of attributes of the uplink control information message comprising a trigger condition for triggering an autonomous transmission configuration indicator state change at the UE, the autonomous transmission configuration indicator state change comprising updating a channel state information-reference signal beam at the UE, wherein the feedback configuration indicates whether the uplink control information message triggers a feedback message from a network entity, the feedback message comprising signaling indicative of a positive acknowledgment of the uplink control information message or a negative acknowledgment of the uplink control information message; and
   monitoring for the feedback message from the network entity responsive to the uplink control information message based at least in part on the feedback configuration.

2. The method of claim 1, wherein the set of attributes comprises a format of the uplink control information message.

3. The method of claim 1, wherein the set of attributes comprises a payload size associated with the uplink control information message.

4. The method of claim 1, wherein the set of attributes comprises a priority of the uplink control channel resources.

5. The method of claim 1, further comprising:
   receiving the feedback message based at least in part on the monitoring; and
   performing the autonomous transmission configuration indicator state change based at least in part on receiving the feedback message.

6. The method of claim 1, wherein the set of attributes comprises a dynamic indication that indicates the feedback configuration for the uplink control information message.

7. The method of claim 1, wherein the set of attributes comprises a scheduling type associated with the uplink control channel resources.

8. The method of claim 1, further comprising:
   retransmitting the uplink control information message based at least in part on the monitoring and expiration of a timer.

9. The method of claim 1, wherein the feedback message comprises an indication of an association between the feedback message and the uplink control information message.

10. The method of claim 9, wherein the indication of the association between the feedback message and the uplink control information message comprises bitmap information corresponding to the uplink control channel resources.

11. The method of claim 1, further comprising:
    receiving the feedback message based at least in part on the monitoring; and
    identifying an association between the feedback message and the uplink control information message based at least in part on a duration between transmitting the uplink control information message and receiving the feedback message.

12. The method of claim 1, further comprising:
    receiving the feedback message in a downlink control information (DCI) message over downlink control channel resources, wherein bitmap information in a field of the DCI message comprises an indication of an association between the feedback message and the uplink control information message.

13. The method of claim 1, wherein the uplink control information message comprises a channel state information report.

14. A method for wireless communication at a network entity, comprising:
    receiving an uplink control information message in uplink control channel resources;
    determining a feedback configuration corresponding to the uplink control information message based at least in part on a set of attributes of the uplink control information message comprising a trigger condition for triggering an autonomous transmission configuration indicator state change at the network entity, the autonomous transmission configuration indicator state change comprising updating a channel state information-reference signal beam at the network entity, wherein the feedback configuration indicates whether the uplink control information message triggers a feedback message from the network entity, the feedback message comprising signaling indicative of a positive acknowledgment of the uplink control information message or a negative acknowledgment of the uplink control information message; and transmitting, from the network entity to a user equipment (UE), the feedback message responsive to the uplink control information message based at least in part on the feedback configuration.

15. The method of claim 14, wherein the set of attributes comprises a format of the uplink control information message.

16. The method of claim 14, wherein the set of attributes comprises a payload size associated with the uplink control information message.

17. The method of claim 14, wherein the set of attributes comprises a priority of the uplink control channel resources.

18. The method of claim 14, further comprising:
transmitting the feedback message based at least in part on receiving the uplink control information message; and
performing the autonomous transmission configuration indicator state change based at least in part on receiving the uplink control information message.

19. The method of claim 14, wherein the set of attributes comprises a dynamic indication that indicates the feedback configuration for the uplink control information message.

20. The method of claim 14, wherein the set of attributes comprises a scheduling type associated with the uplink control channel resources.

21. The method of claim 14, further comprising:
receiving a retransmission of the uplink control information message based at least in part on expiration of a timer.

22. The method of claim 14, wherein the feedback message comprises an indication of an association between the feedback message and the uplink control information message.

23. The method of claim 22, wherein the indication of the association between the feedback message and the uplink control information message comprises bitmap information corresponding to of the uplink control channel resources.

24. The method of claim 14, further comprising:
transmitting the feedback message in a downlink control information (DCI) message over downlink control channel resources,
wherein bitmap information in a field of the DCI message comprises an indication of an association between the feedback message and the uplink control information message.

25. An apparatus for wireless communication at a user equipment (UE), comprising:
a processor, and
memory coupled with the processor and comprising instructions, wherein the instructions are executable by the processor to cause the apparatus to:

transmit an uplink control information message in uplink control channel resources;
determine a feedback configuration corresponding to the uplink control information message based at least in part on a set of attributes of the uplink control information message comprising a trigger condition for triggering an autonomous transmission configuration indicator state change at the UE, the autonomous transmission configuration indicator state change comprising updating a channel state information-reference signal beam at the UE, wherein the feedback configuration indicates whether the uplink control information message triggers a feedback message from a network entity, the feedback message comprising signaling indicative of a positive acknowledgment of the uplink control information message or a negative acknowledgment of the uplink control information message; and
monitor for the feedback message from the network entity responsive to the uplink control information message based at least in part on the feedback configuration.

26. The apparatus of claim 25, wherein the set of attributes comprises a format of the uplink control information message.

27. The apparatus of claim 25, wherein the set of attributes comprises a payload size associated with the uplink control information message.

28. An apparatus for wireless communication at a network entity, comprising:
a processor, and
memory coupled with the processor and comprising instructions, wherein the instructions are executable by the processor to cause the apparatus to:
receive an uplink control information message in uplink control channel resources;
determine a feedback configuration corresponding to the uplink control information message based at least in part on a set of attributes of the uplink control information message comprising a trigger condition for triggering an autonomous transmission configuration indicator state change at the network entity, the autonomous transmission configuration indicator state change comprising updating a channel state information-reference signal beam at the network entity, wherein the feedback configuration indicates whether the uplink control information message triggers a feedback message from the network entity, the feedback message comprising that signaling indicative of a positive acknowledgment of the uplink control information message or a negative acknowledgment of the uplink control information message; and
transmit, from the network entity to a user equipment (UE), the feedback message responsive to the uplink control information message based at least in part on the feedback configuration.

* * * * *